US012692187B2

(12) United States Patent
Aitken et al.

(10) Patent No.: US 12,692,187 B2
(45) Date of Patent: Jul. 28, 2026

(54) HIGH-INDEX HIGH-DISPERSION PHOSPHATE GLASSES CONTAINING BISMUTH OXIDE

(71) Applicant: CORNING INCORPORATED, Corning, NY (US)

(72) Inventors: Bruce Gardiner Aitken, Corning, NY (US); Jian Luo, Cupertino, CA (US); Lina Ma, Corning, NY (US); Alexander I Priven, Sejong-si (KR)

(73) Assignee: CORNING INCORPORATED, Corning, NY (US)

( * ) Notice: Subject to any disclaimer, the term of this patent is extended or adjusted under 35 U.S.C. 154(b) by 588 days.

(21) Appl. No.: 18/123,657

(22) Filed: Mar. 20, 2023

(65) Prior Publication Data

US 2023/0303426 A1     Sep. 28, 2023

Related U.S. Application Data

(60) Provisional application No. 63/323,648, filed on Mar. 25, 2022.

(51) Int. Cl.
*C03C 3/21* (2006.01)
*C03C 3/16* (2006.01)

(52) U.S. Cl.
CPC . *C03C 3/21* (2013.01); *C03C 3/16* (2013.01)

(58) Field of Classification Search
CPC .................................... C03C 3/21; C03C 3/16
See application file for complete search history.

(56) References Cited

U.S. PATENT DOCUMENTS

| | | | |
|---|---|---|---|
| 7,309,670 B2 | 12/2007 | Fujiwara et al. | |
| 7,553,785 B2 | 6/2009 | Ritter et al. | |
| 7,994,082 B2 | 8/2011 | Zou et al. | |
| 8,389,428 B2 | 3/2013 | Wada et al. | |
| 8,486,536 B2 | 7/2013 | Zou et al. | |
| 8,647,994 B2 | 2/2014 | Fujiwara | |
| 8,716,157 B2 | 5/2014 | Fujiwara et al. | |
| 8,945,713 B2 | 2/2015 | Satou et al. | |
| 8,993,115 B2 | 3/2015 | Igari et al. | |
| 2004/0266602 A1* | 12/2004 | Fujiwara ................... | C03C 3/21 501/46 |
| 2012/0142516 A1* | 6/2012 | Fujiwara ................... | C03C 3/21 501/45 |
| 2021/0048665 A1 | 2/2021 | Nakamura et al. | |
| 2021/0179479 A1 | 6/2021 | Amma et al. | |
| 2022/0234941 A1 | 7/2022 | Aitken et al. | |
| 2023/0278911 A1 | 9/2023 | Sasaki | |

FOREIGN PATENT DOCUMENTS

| | | | |
|---|---|---|---|
| CN | 111960665 A | 11/2020 | |
| CN | 111977969 A | 11/2020 | |
| CN | 113024107 A | 6/2021 | |
| JP | 2003-160355 A | 6/2003 | |
| JP | 2004-123448 A | 4/2004 | |
| JP | 2006-111499 A | 4/2006 | |
| JP | 2007-015904 A | 1/2007 | |
| JP | 2010-083701 A | 4/2010 | |
| JP | 2012-017261 A | 1/2012 | |
| JP | 2020040870 A * | 3/2020 | |
| WO | 2019/151404 A1 | 8/2019 | |
| WO | 2022/159275 A1 | 7/2022 | |

OTHER PUBLICATIONS

International Search Report and Written Opinion of the International Searching Authority; PCT/US2023/014865; dated Jun. 27, 2023; 9 pages; European Patent Office.

* cited by examiner

*Primary Examiner* — Elizabeth A. Bolden

(74) *Attorney, Agent, or Firm* — Kevin L. Bray

(57)     ABSTRACT

Glass compositions include phosphorus oxide ($P_2O_5$), niobia ($Nb_2O_5$), titania ($TiO_2$) and bismuth oxide ($Bi_2O_3$) as essential components and may optionally include barium oxide (BaO), calcium oxide (CaO), potassium oxide ($K_2O$), lithium oxide ($Li_2O$), sodium oxide ($Na_2O$), tungsten oxide ($WO_3$), boron oxide ($B_2O_3$) and other components. The glasses may be characterized by high refractive index at 587.56 nm at comparably low density at room temperature.

20 Claims, 5 Drawing Sheets

HIGH-INDEX HIGH-DISPERSION PHOSPHATE GLASSES CONTAINING BISMUTH OXIDE

This Application claims the benefit of priority to U.S. Provisional Patent Application Ser. No. 63/323,648 filed on Mar. 25, 2022, the content of which is relied upon and incorporated herein by reference in its entirety.

FIELD

The present disclosure generally relates to phosphate glasses having a high refractive index and low density. Also, it relates to glasses with high optical dispersion.

BACKGROUND

Glass is used in a variety of optical devices, examples of which include augmented reality devices, virtual reality devices, mixed reality devices, eye wear, etc. Desirable properties for this type of glass often include a high refractive index and a low density. Additional desirable properties may include high transmission in the visible and near-ultraviolet (near-UV) range of the electromagnetic spectrum and/or low optical dispersion. It can be challenging to find glasses having the desired combination of these properties and which can be formed from compositions having good glass-forming ability. For example, generally speaking, as the refractive index of a glass increases, the density also tends to increase. Species such as $TiO_2$ and $Nb_2O_5$ are often added to increase the refractive index of a glass without increasing the density of the glass. However, these materials often absorb blue and UV light, which can undesirably decrease the transmittance of light in this region of the spectrum by the glass. Often, attempts to increase the refractive index of a glass while maintaining a low density, and without decreasing transmittance in the blue and UV region of the spectrum, can result in a decrease in the glassforming ability of the material. For example, crystallization and/or liquid-liquid phase separation can occur during cooling of the glass melt at cooling rates that are generally acceptable in the industry. Typically, the decrease in glass-forming ability appears as the amount of certain species, such as $ZrO_2$, $Y_2O_3$, $Sc_2O_3$, BeO, etc. increases.

Low density, high refractive index glasses often belong to one of two types of chemical systems, based on the glass formers used: (a) silicoborate or borosilicate glasses in which $SiO_2$ and/or $B_2O_3$ are used as the main glass formers and (b) phosphate glasses in which $P_2O_5$ is used as a main glass former. Glasses which rely on other oxides as main glass formers, such as $GeO_2$, $TeO_2$, $Bi_2O_3$, and $V_2O_5$, can be challenging to use due to cost, glass-forming ability, optical properties, and/or production requirements.

Phosphate glasses can be characterized by a high refractive index and low density, however, phosphate glasses can be challenging to produce due to volatilization of $P_2O_5$ from the melts and/or risks of platinum incompatibility. In addition, phosphate glasses are often highly colored and may require an extra bleaching step to provide a glass having the desired transmittance characteristic. Furthermore, phosphate glasses exhibiting a high refractive index also tend to have an increase in optical dispersion, which may be usable for some applications.

In view of these considerations, there is a need for phosphate glasses having a high refractive index and low density, optionally in combination with a high transmittance in the visible and near UV-range, and/or which are made from compositions that provide good glass-forming ability.

SUMMARY

According to an embodiment of the present disclosure, a glass comprises a plurality of components, the glass having a composition of the components comprising greater than or equal to 15.9 mol. % and less than or equal to 50.0 mol. % $P_2O_5$, greater than or equal to 4.5 mol. % and less than or equal to 50.0 mol. % $Bi_2O_3$, greater than or equal to 0.0 mol. % and less than or equal to 50.0 mol. % $TiO_2$, greater than or equal to 0.0 mol. % and less than or equal to 50.0 mol. % $Nb_2O_5$, greater than or equal to 0.0 mol. % and less than or equal to 25.0 mol. % $Li_2O$, greater than or equal to 0.0 mol. % and less than or equal to 25.0 mol. % $K_2O$, greater than or equal to 0.0 mol. % and less than or equal to 20.0 mol. % $Na_2O$, greater than or equal to 0.0 mol. % and less than or equal to 6.0 mol. % $WO_3$, greater than or equal to 0.0 mol. % and less than or equal to 1.0 mol. % $V_2O_5$, a sum of $TiO_2+Nb_2O_5$ greater than or equal to 25.0 mol. % and less than or equal to 70.0 mol. %, a sum of $Alk_2O$ greater than or equal to 0.5 mol. % and less than or equal to 30.0 mol. %, a sum of RO greater than or equal to 0.5 mol. % and less than or equal to 30.0 mol. %, a sum of $GeO_2+TeO_2$ greater than or equal to 0.0 mol. % and less than or equal to 25.0 mol. % and may optionally contain $Al_2O_3$, wherein the composition of the components satisfies the condition: $Alk_2O+RO+Bi_2O_3+3*Al_2O_3-P_2O_5$ [mol. %]$\geq-8.0$, where $Alk_2O$ is a total sum of alkali metal oxides, and RO is a total sum of divalent metal oxides.

According to another embodiment of the present disclosure, a glass comprises a plurality of components, the glass having a composition of the components comprising greater than or equal to 23.0 mol. % and less than or equal to 35.0 mol. % $P_2O_5$, greater than or equal to 4.5 mol. % and less than or equal to 35.0 mol. % $Bi_2O_3$, greater than or equal to 0.5 mol. % and less than or equal to 55.0 mol. % $Nb_2O_5$, greater than or equal to 0.5 mol. % and less than or equal to 55.0 mol. % $TiO_2$, greater than or equal to 0.3 mol. % and less than or equal to 20.0 mol. % $Li_2O$ and may optionally contain one or more components selected from BaO, $K_2O$, CaO, $Na_2O$, SrO, $WO_3$, $B_2O_3$, $SiO_2$, ZnO, $ZrO_2$, MgO, $Al_2O_3$, $TeO_2$, PbO, $GeO_2$, $Tl_2O$, $Ag_2O$, CdO, $Cs_2O$, $Ga_2O_3$, $La_2O_3$, $MoO_3$, $Ta_2O_5$ and $V_2O_5$, the glass satisfies the condition: $P_n-(1.14+0.192*P_d)>0.000$, where $P_n$ is a parameter predicting a refractive index at 587.56 nm, $n_d$, calculated from the glass composition in terms of mol. % of the components according to the Formula (I):

$$P_n=1.865-0.0052736*P_2O_5+0.0071201*Nb_2O_5+$$
$$0.0031659*TiO_2-0.0008032*BaO-$$
$$0.0047736*K_2O-0.00076807*CaO-$$
$$0.0027991*Na_2O-0.0016514*Li_2O-$$
$$0.00069646*SrO+0.0032628*WO_3+$$
$$0.007519*Bi_2O_3-0.0040698*B_2O_3-$$
$$0.0035951*SiO_2-0.00067102*ZnO+$$
$$0.0022313*ZrO_2-0.0019531*MgO-$$
$$0.003506*Al_2O_3+0.0019216*TeO_2+$$
$$0.0025766*PbO-0.0018844*GeO_2+$$
$$0.0065444*Tl_2O+0.0052048*Ag_2O, \qquad (I)$$

and $P_d$ is a parameter predicting a density at room temperature, $d_{RT}$, calculated from the glass composition in terms of mol. % of the components according to the Formula (II):

$$P_d=4.45-0.020780*Al_2O_3-0.020918*B_2O_3+$$
$$0.014152*BaO+0.061008*Bi_2O_3-$$
$$0.0067411*CaO+0.013529*CdO+$$
$$0.012560*Cs_2O+0.0028892*Ga_2O_3-$$
$$0.0057012*GeO_2-0.017838*K_2O+$$

$0.046524*La_2O_3 - 0.013919*Li_2O - 0.010279*MgO - 0.0064231*MoO_3 - 0.012983*Na_2O + 0.0083294*Nb_2O_5 - 0.028926*P_2O_5 + 0.031742*PbO - 0.019022*SiO_2 + 0.0045214*SrO + 0.050158*Ta_2O_5 + 0.0088486*TeO_2 - 0.0063053*TiO_2 - 0.018941*V_2O_5 + 0.027483*WO_3 - 0.0010277*ZnO + 0.0100487*ZrO_2$,      (II).

These and other aspects, objects, and features of the present disclosure will be understood and appreciated by those skilled in the art upon studying the following specification, claims, and appended drawings.

DETAILED DESCRIPTION

Figure 1:
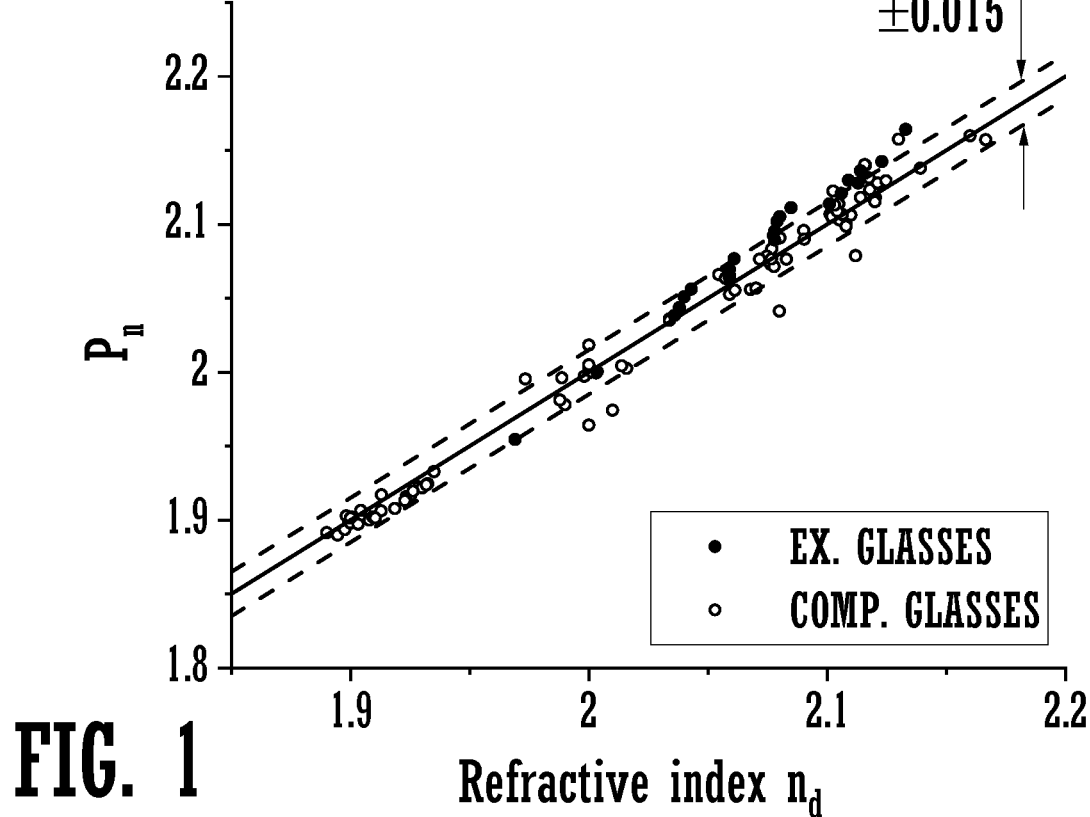
FIG. 1 is a plot illustrating the relationship between the refractive index $n_d$ and the refractive index parameter $P_n$ calculated by formula (I) for some Comparative Glasses and some Exemplary Glasses according to an embodiment of the present disclosure.

In the following detailed description, for purposes of explanation and not limitation, example embodiments disclosing specific details are set forth to provide a thorough understanding of various principles of the present disclosure. However, it will be apparent to one having ordinary skill in the art, having had the benefit of the present disclosure, that the present disclosure may be practiced in other embodiments that depart from the specific details disclosed herein. Moreover, descriptions of well-known devices, methods and materials may be omitted so as not to obscure the description of various principles of the present disclosure. Finally, wherever applicable, like reference numerals refer to like elements.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including, without limitation, matters of logic with respect to arrangement of steps or operational flow; plain meaning derived from grammatical organization or punctuation; the number or type of embodiments described in the specification.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those skilled in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The term "component" refers to a material or compound included in a batch composition from which a glass is formed. Components include oxides, including but not limited to those expressed in Formulas (I), and (II), and the claims. Representative components include $B_2O_3$, $P_2O_5$, $Al_2O_3$, $CuO$, $Cu_2O$, $RO$, $R_2O$, $SnO_2$, $MnO_2$, $RE_mO_n$, $SiO_2$, $Ta_2O_5$, $ZnO$, $WO_3$, $Nb_2O_5$, $TiO_2$, $ZrO_2$, $Bi_2O_3$, $TeO_2$, etc. Other representative components include halogens (e.g. F, Br, Cl). Whenever a component is included as a term in a mathematical expression or formula, it is understood that the component refers to the amount of the component in units of mol. % in the batch composition of the glass. For example, the expression "$B_2O_3 + P_2O_5$" refers to the sum of the amount of $B_2O_3$ in units of mol. % and the amount of $P_2O_5$ in units of mol. % in the batch composition of the glass. A mathematical expression or formula is any expression or formula that includes a mathematical operator such as "+", "−", "*", "/", "min", or "max".

Unless otherwise specified, the amount or content of a component in a glass composition is expressed herein in units of mol. % (mole percent).

The term "formed from" can mean one or more of comprises, consists essentially of, or consists of. For example, a component that is formed from a particular material can comprise the particular material, consist essentially of the particular material, or consist of the particular material.

The terms "free" and "substantially free" are used interchangeably herein to refer to an amount and/or an absence of a particular component in a glass composition that is not intentionally added to the glass composition. It is understood that the glass composition may contain traces of a particular constituent component as a contaminant or a tramp in an amount of less than 0.10 mol. %.

As used herein, the term "tramp", when used to describe a particular constituent component in a glass composition, refers to a constituent component that is not intentionally added to the glass composition and is present in an amount of less than 0.10 mol. %. Tramp components may be unintentionally added to the glass composition as an impurity in another constituent component and/or through migration of the tramp component into the composition during processing of the glass composition.

Unless otherwise specified, the term "glass" is used to refer to a glass made from a glass composition disclosed herein.

The symbol "*" means multiplication when used in any formula herein.

Temperature is expressed herein in units of ° C. (degrees Celsius).

Density is expressed herein in units of $g/cm^3$.

Viscosity is expressed herein in units of P (Poise).

The term "glass former" is used herein to refer to a component that, being solely present in the glass composition (i.e., without other components, except for tramps), is able to form a glass when cooling the melt at a rate of not greater than about 300° C./min.

The term "modifier", as used herein, refers to the oxides of monovalent or divalent metals, i.e., $R_2O$ or $RO$, where "R" stands for a cation. Modifiers can be added to a glass composition to change the atomic structure of the melt and the resulting glass. In some embodiments, the modifier may change the coordination numbers of cations present in the glass formers (e.g., boron in $B_2O_3$), which may result in forming a more polymerized atomic network and, as a result, may provide better glass formation.

As used herein, the term "RO" refers to a total content of divalent metal oxides, the term "$R_2O$" refers to a total content of monovalent metal oxides, and the term "$Alk_2O$" refers to a total content of alkali metal oxides. The term $R_2O$ encompasses alkali metal oxides ($Alk_2O$), in addition to other monovalent metal oxides, such as $Ag_2O$, $Tl_2O$, and $Hg_2O$, for example. As discussed below, in the present disclosure, a rare earth metal oxide is referred to herein by its normalized formula ($RE_2O_3$) in which the rare earth metal has the redox state "+3," and thus rare earth metal oxides are not encompassed by the term RO.

As used herein, the term "rare earth metals" refers to the metals listed in the Lanthanide Series of the IUPAC Periodic Table, plus yttrium and scandium. As used herein, the term "rare earth metal oxides," is used to refer to the oxides of rare earth metals in different redox states, such as "+3" for lanthanum in $La_2O_3$, "+4" for cerium in $CeO_2$, "+2" for europium in $EuO$, etc. In general, the redox states of rare earth metals in oxide glasses may vary and, in particular, the redox state may change during melting, based on the batch composition and/or the redox conditions in the furnace where the glass is melted and/or heat-treated (e.g., annealed). Unless otherwise specified, a rare earth metal oxide is referred to herein by its normalized formula in which the rare earth metal has the redox state "+3." Accordingly, in the case in which a rare earth metal having a redox state other than "+3" is added to the glass composition batch, the glass compositions are recalculated by adding or removing some oxygen to maintain the stoichiometry. For example, when $CeO_2$ (with cerium in redox state "+4") is used as a batch component, the resulting glass composition is recalculated assuming that two moles of $CeO_2$ is equivalent to one mole of $Ce_2O_3$, and the resulting as-batched glass composition is presented in terms of $Ce_2O_3$. As used herein, the term "$RE_mO_n$" is used to refer to the total content of rare earth metal oxides in all redox states present, and the term "$RE_2O_3$" is used to refer to the total content of rare earth metal oxides in the "+3" redox state, also specified as "trivalent equivalent".

Unless otherwise specified, all compositions are expressed in terms of as-batched mole percent (mol %). As will be understood by those having ordinary skill in the art, various melt constituents (e.g., fluorine, alkali metals, boron, etc.) may be subject to different levels of volatilization (e.g., as a function of vapor pressure, melt time and/or melt temperature) during melting of the constituents. As such, the term "about," in relation to such constituents, is intended to encompass values within about 0.2 mol % when measuring final articles as compared to the as-batched compositions provided herein. With the forgoing in mind, substantial compositional equivalence between final articles and as-batched compositions is expected.

The measured density values for the glasses reported herein were measured at room temperature in units of $g/cm^3$ by Archimedes method in water with an error of 0.001 $g/cm^3$. As used herein, density measurements at room temperature (specified as $d_{RT}$) are indicated as being measured at 20° C. or 25° C., and encompass measurements obtained at temperatures that may range from 20° C. to 25° C. It is understood that room temperature may vary between about 20° C. to about 25° C., however, for the purposes of the present disclosure, the variation in density within the temperature range of 20° C. to 25° C. is expected to be less than the error of 0.001 $g/cm^3$, and thus is not expected to impact the room temperature density measurements reported herein.

As used herein, good glass forming ability refers to a resistance of the melt to devitrification as the material cools. Glass forming ability can be measured by determining the critical cooling rate of the melt. The terms "critical cooling rate" or "$v_{cr}$" are used herein to refer to the minimum cooling rate at which a melt of a given composition forms a glass free of crystals visible under an optical microscope under magnification of 500×. The critical cooling rate can be used to measure the glass-forming ability of a composition, i.e., the ability of the melt of a given glass composition to form glass when cooling. Generally speaking, the lower the critical cooling rate, the better the glass-forming ability.

The term "liquidus temperature" ($T_{liq}$) is used herein to refer to a temperature above which the glass composition is completely liquid with no crystallization of constituent components of the glass. The liquidus temperature values reported herein were obtained by measuring samples using either DSC or by isothermal hold of samples wrapped in platinum foil. For samples measured using DSC, powdered samples were heated at 10 K/min to 1250° C. The end of the endothermal event corresponding to the melting of crystals was taken as the liquidus temperature. For the second technique (isotactic hold), a glass block (about 1 $cm^3$) was wrapped in platinum foil, to avoid volatilization, and placed in a furnace at a given temperature for 17 hours. The glass block was then observed under an optical microscope to check for crystals.

The refractive index values reported herein were measured at room temperature, unless otherwise specified. The refractive index values for a glass sample were measured using a Metricon Model 2010 prism coupler refractometer with an error of about ±0.0002. Using the Metricon, the refractive index of a glass sample was measured at two or more wavelengths of about 406 nm, 473 nm, 532 nm, 633 nm, 828 nm, and 1064 nm. The measured dependence characterizes the dispersion and was then fitted with a Cauchy's law equation or Sellmeier equation to allow for calculation of the refractive index of the sample at a given wavelength of interest between the measured wavelengths. The term "refractive index $n_d$" is used herein to refer to a refractive index calculated as described above at a wavelength of 587.56 nm, which corresponds to the helium d-line wavelength. The term "refractive index $n_C$" is used herein to refer to a refractive index calculated as described above at a wavelength of 656.3 nm. The term "refractive index $n_F$" is used herein to refer to a refractive index calculated as described above at a wavelength of 486.1 nm. The term "refractive index ng" is used herein to refer to a refractive index calculated as described above at a wavelength of 435.8 nm.

As used herein, the terms "high refractive index" or "high index" refers to a refractive index value of a glass that is greater than or equal to at least 1.80, unless otherwise indicated. Where indicated, terms "high refractive index" or "high index" refers to a refractive index value of a glass that is greater than or equal to at least 1.85, greater than or equal to 1.90, or greater than or equal to 1.95, or greater than or equal to 2.00.

The terms "dispersion" and "optical dispersion" are used interchangeably to refer to a difference or ratio of the refractive indices of a glass sample at predetermined wavelengths. One numerical measure of optical dispersion reported herein is the Abbe number, which can be calculated by the formula: $v_x=(n_x-1)/(n_F-n_C)$, where "x" in the present disclosure stands for one of the commonly used wavelengths (for example, 587.56 nm [d-line] or 589.3 nm [D-line]), nx is the refractive index at this wavelength, and $n_F$ and $n_C$ are refractive indices at the wavelengths 486.1 nm (F-line) and 656.3 nm (C-line), respectively. The numerical values of $v_d$ and $V_D$ differ very slightly, mostly within ±0.1% to ±0.2%. As reported herein, the dispersion of a glass sample is represented by the Abbe number $(v_d)$, which characterizes the relationship between the refractive indices of the sample at three different wavelengths according to the following formula: $v_d=(n_d-1)/(n_F-n_C)$, where $n_d$ is the calculated refractive index at 587.56 nm (d-line), $n_F$ is the calculated refractive index at 486.1 nm, and $n_C$ is the calculated refractive index at 656.3 nm. A higher Abbe number corresponds to a lower optical dispersion.

The numerical value for an Abbe number corresponding to "high dispersion" or "low dispersion" may vary depending on the refractive indices for which the Abbe number is calculated. In some cases, an Abbe number corresponding to "low dispersion" for a high refractive index glass may be lower than an Abbe number corresponding to "low dispersion" for a low refractive index glass. In other words, as the calculated refractive index value increases, the value of the Abbe number corresponding to low dispersion decreases. The same relates to "high dispersion" as well.

The glass transition temperature $(T_g)$ is measured by differential scanning calorimeter (DSC) at the heating rate of 10 K/min after cooling in air.

Glass composition may include phosphorus oxide $(P_2O_5)$. The glass compositions in the embodiments described herein comprise phosphorus oxide $(P_2O_5)$ as a main glass former. Greater amounts of $P_2O_5$ cause greater viscosity values at a given temperature, which protects the melts from crystallization when cooling and, therefore, improves the glass forming ability of the melt (i.e. lowers the critical cooling rate of the melt). However, $P_2O_5$ significantly decrease the refractive index. Accordingly, the content of $P_2O_5$ in high-index glasses is limited. In embodiments, the glass composition may contain phosphorus oxide $(P_2O_5)$ in an amount from greater than or equal to 15.9 mol. % to less than or equal to 50.0 mol. % and all ranges and sub-ranges between the foregoing values. In some embodiments, the glass composition may contain $P_2O_5$ in an amount greater than or equal to 15.9 mol. %, greater than or equal to 17.5 mol. %, greater than or equal to 18.0 mol. %, greater than or equal to 20.0 mol. %, greater than or equal to 23.0 mol. %, greater than or equal to 23.5 mol. %, greater than or equal to 24.05 mol. %, greater than or equal to 24.5 mol. %, greater than or equal to 35.0 mol. %, greater than or equal to 40.0 mol. %, or greater than or equal to 45.0 mol. %. In some other embodiments, the glass composition may contain $P_2O_5$ in an amount less than or equal to 50.0 mol. %, less than or equal to 45.0 mol. %, less than or equal to 40.0 mol. %, less than or equal to 35.0 mol. %, less than or equal to 28.0 mol. %, less than or equal to 27.5 mol. %, less than or equal to 25.5 mol. %, less than or equal to 25.0 mol. %, or less than or equal to 20.0 mol. %. In some more embodiments, the glass composition may contain $P_2O_5$ in an amount greater than or equal to 15.9 mol. % and less than or equal to 50.0 mol. %, greater than or equal to 17.5 mol. % and less than or equal to 27.5 mol. %, greater than or equal to 18.0 mol. % and less than or equal to 28.0 mol. %, greater than or equal to 23.0 mol. % and less than or equal to 35.0 mol. %, greater than or equal to 23.5 mol. % and less than or equal to 25.5 mol. %, greater than or equal to 24.05 mol. % and less than or equal to 25.05 mol. %, greater than or equal to 24.2 mol. % and less than or equal to 25.0 mol. %, greater than or equal to 24.48 mol. % and less than or equal to 24.99 mol. %, greater than or equal to 15.9 mol. % and less than or equal to 20.0 mol. %, greater than or equal to 17.5 mol. % and less than or equal to 50.0 mol. %, greater than or equal to 20.0 mol. % and less than or equal to 25.0 mol. %, greater than or equal to 23.0 mol. % and less than or equal to 50.0 mol. %, greater than or equal to 23.0 mol. % and less than or equal to 25.0 mol. %, greater than or equal to 23.5 mol. % and less than or equal to 50.0 mol. %, greater than or equal to 23.5 mol. % and less than or equal to 25.0 mol. %, greater than or equal to 24.05 mol. % and less than or equal to 25.0 mol. %.

Glass composition may include germania $(GeO_2)$. Germania $(GeO_2)$ provides a high ratio of refractive index to density and does not reduce visible transmittance. Germania is a glass forming oxide. However, germania is expensive and accordingly, the content of germania should be limited, or glass compositions may be free of $GeO_2$. In embodiments, the glass composition may contain germania $(GeO_2)$ in an amount from greater than or equal to 0.0 mol. % to less than or equal to 25.0 mol. % and all ranges and sub-ranges between the foregoing values. In some embodiments, the glass composition may contain $GeO_2$ in an amount greater than or equal to 0.0 mol. %, greater than or equal to 5.0 mol. %, greater than or equal to 10.0 mol. %, greater than or equal to 19.0 mol. %, greater than or equal to 20.0 mol. %, greater than or equal to 21.0 mol. %, or greater than or equal to 23.0 mol. %. In some other embodiments, the glass composition may contain $GeO_2$ in an amount less than or equal to 25.0 mol. %, less than or equal to 23.0 mol. %, less than or equal to 21.0 mol. %, less than or equal to 20.0 mol. %, less than or equal to 19.0 mol. %, less than or equal to 10.0 mol. %, or less than or equal to 5.0 mol. %. In some more embodiments, the glass composition may contain $GeO_2$ in an amount greater than or equal to 0.0 mol. % and less than or equal to 5.0 mol. %, greater than or equal to 0.0 mol. % and less than or equal to 25.0 mol. %, greater than or equal to 5.0 mol. % and less than or equal to 25.0 mol. %, greater than or equal to 5.0 mol. % and less than or equal to 10.0 mol. %, greater than or equal to 10.0 mol. % and less than or equal to 25.0 mol. %, greater than or equal to 10.0 mol. % and less than or equal to 19.0 mol. %, greater than or equal to 19.0 mol. % and less than or equal to 25.0 mol. %, greater than or equal to 19.0 mol. % and less than or equal to 20.0 mol. %, greater than or equal to 20.0 mol. % and less than or equal to 25.0 mol. %, greater than or equal to 20.0 mol. % and less than or equal to 21.0 mol. %.

Glass composition may include boron oxide ($B_2O_3$). According to some embodiments of the present disclosure, boron oxide may play a role of a glass former. As a glass former, $B_2O_3$ may increase the liquidus viscosity and, therefore, inhibit crystallization. However, adding $B_2O_3$ to a glass composition may cause liquid-liquid phase separation, which may cause devitrification and/or a reduction in the visible transmittance of the resulting glass. Also, adding $B_2O_3$ to the high-index glasses reduces the refractive index. Accordingly, the amount of boron oxide is limited, or glasses may be substantially free of $B_2O_3$. In embodiments, the glass composition may contain boron oxide ($B_2O_3$) in an amount from greater than or equal to 0.0 mol. % to less than or equal to 10.0 mol. % and all ranges and sub-ranges between the foregoing values. In some embodiments, the glass composition may contain $B_2O_3$ in an amount greater than or equal to 0.0 mol. %, or greater than or equal to 5.0 mol. %. In some other embodiments, the glass composition may contain $B_2O_3$ in an amount less than or equal to 10.0 mol. %, less than or equal to 10.0 mol. %, less than or equal to 8.0 mol. %, or less than or equal to 5.0 mol. %. In some more embodiments, the glass composition may contain $B_2O_3$ in an amount greater than or equal to 0.0 mol. % and less than or equal to 15.0 mol. %, greater than or equal to 0.0 mol. % and less than or equal to 8.0 mol. %, greater than or equal to 0.0 mol. % and less than or equal to 5.0 mol. %, greater than or equal to 5.0 mol. % and less than or equal to 15.0 mol. %, greater than or equal to 5.0 mol. % and less than or equal to 8.0 mol. %.

Glass composition may include alkali metal oxides ($Alk_2O$). Alkali metal oxides ($Li_2O$, $Na_2O$, $K_2O$, $Rb_2O$ and $Cs_2O$) may help to incorporate high-index components, such as $TiO_2$, $Nb_2O_5$ or $WO_3$, in the glass structure at a given density. Most commonly, $Li_2O$, $Na_2O$ and/or $K_2O$ are used for this purpose. Among these three oxides, typically, $K_2O$ provides the greatest effect on solubility of the high-index components; however, addition of $K_2O$ itself may reduce the refractive index. $Li_2O$ typically provides the greatest ratio of the refractive index to density among the alkali metal oxides, but it has the lowest effect on solubility of the high-index components. Sodium oxide ($Na_2O$) typically provides an effect intermediate between $Li_2O$ and $K_2O$. However, exact effects of these oxides on glass forming ability are difficult to predict, and in different embodiments, the desirable proportions between these oxides may vary. In particular, in some embodiments, it is desirable to add all of three oxides ($Li_2O$, $Na_2O$ and $K_2O$), or two of them, together with each other. Also, in some embodiments, use of monovalent metal oxides ($R_2O$) together with divalent metal oxides (RO) improves the glass forming ability of glasses and may enable higher refractive indices at a given density. Accordingly, in some embodiments of the present disclosure the total content of alkali metal oxides may be limited.

In some embodiments, the glass composition may contain alkali metal oxides $Alk_2O$ in an amount greater than or equal to 0.5 mol. %, greater than or equal to 10.0 mol. %, or greater than or equal to 20.0 mol. %. In some other embodiments, the glass composition may contain alkali metal oxides $Alk_2O$ in an amount less than or equal to 30.0 mol. %, less than or equal to 20.0 mol. %, or less than or equal to 10.0 mol. %. In some more embodiments, the glass composition may contain alkali metal oxides $Alk_2O$ in an amount greater than or equal to 0.5 mol. % and less than or equal to 30.0 mol. %, greater than or equal to 0.5 mol. % and less than or equal to 20.0 mol. %, or greater than or equal to 0.5 mol. % and less than or equal to 10.0 mol. %, greater than or equal to 10.0 mol. % and less than or equal to 30.0 mol. %, or greater than or equal to 10.0 mol. % and less than or equal to 20.0 mol. %.

Glass composition may include potassium oxide ($K_2O$). Potassium oxide may increase the solubility of high-index components, such as $TiO_2$ and $Nb_2O_5$, to a degree greater than other monovalent and divalent metal oxides. However, potassium oxide itself provides the lowest refractive index among the alkali metal oxides. Therefore, at high concentrations of $K_2O$, it may be difficult to reach high refractive index. Accordingly, the amount of $K_2O$ in glasses of the present disclosure is limited, or glasses may be substantially free of $K_2O$. In embodiments, the glass composition may contain potassium oxide ($K_2O$) in an amount from greater than or equal to 0.0 mol. % to less than or equal to 25.0 mol. % and all ranges and sub-ranges between the foregoing values. In some embodiments, the glass composition may contain $K_2O$ in an amount greater than or equal to 0.0 mol. %, greater than or equal to 2.0 mol. %, greater than or equal to 5.0 mol. %, greater than or equal to 10.0 mol. %, greater than or equal to 19.0 mol. %, greater than or equal to 20.0 mol. %, greater than or equal to 21.0 mol. %, or greater than or equal to 23.0 mol. %. In some other embodiments, the glass composition may contain $K_2O$ in an amount less than or equal to 25.0 mol. %, less than or equal to 23.0 mol. %, less than or equal to 21.0 mol. %, less than or equal to 20.0 mol. %, less than or equal to 19.0 mol. %, less than or equal to 10.0 mol. %, less than or equal to 8.0 mol. %, less than or equal to 7.5 mol. %, or less than or equal to 5.0 mol. %. In some more embodiments, the glass composition may contain $K_2O$ in an amount greater than or equal to 0.0 mol. % and less than or equal to 25.0 mol. %, greater than or equal to 0.0 mol. % and less than or equal to 10.0 mol. %, greater than or equal to 0.0 mol. % and less than or equal to 7.5 mol. %, greater than or equal to 2.06 mol. % and less than or equal to 7.5 mol. %, greater than or equal to 5.0 mol. % and less than or equal to 7.5 mol. %, greater than or equal to 10.0 mol. % and less than or equal to 19.0 mol. %, greater than or equal to 19.0 mol. % and less than or equal to 20.0 mol. %.

Glass composition may include lithium oxide ($Li_2O$). Lithium oxide provides the highest ratio of the refractive index to density of glasses among the known monovalent metal oxides. Also, in some embodiments, $Li_2O$ may help to increase the solubility of $Nb_2O_5$ and $TiO_2$, which additionally raises the refractive index at a given density. In addition, lithium oxide may hasten the process of bleaching the glasses. However, addition of $Li_2O$, even in small enough concentrations, may decrease the glass forming ability of glasses, causing crystallization or liquid-liquid phase separation of glassforming melts when cooling. Therefore, the amount of $Li_2O$ is limited. In some embodiments, the glasses may be substantially free of $Li_2O$. In embodiments, the glass composition may contain lithium oxide ($Li_2O$) in an amount from greater than or equal to 0.0 mol. % to less than or equal to 25.0 mol. % and all ranges and sub-ranges between the foregoing values. In some embodiments, the glass composition may contain $Li_2O$ in an amount greater than or equal to 0.0 mol. %, greater than or equal to 0.1 mol. %, greater than or equal to 0.3 mol. %, greater than or equal to 5.0 mol. %, greater than or equal to 10.0 mol. %, greater than or equal to 19.0 mol. %, greater than or equal to 20.0 mol. %, greater than or equal to 21.0 mol. %, or greater than or equal to 23.0 mol. %. In some other embodiments, the glass composition may contain $Li_2O$ in an amount less than or equal to 25.0 mol. %, less than or equal to 23.0 mol. %, less than or equal to 21.0 mol. %, less than or equal to 20.0 mol. %, less than or equal to 19.0 mol. %, less than or equal to 10.0 mol. %, less than or equal to 7.5 mol. %, less than or equal to 6.5 mol. %, less than or equal to 5.75 mol. %, less than or equal to 5.0 mol. %, or less than or equal to 2.1 mol. %. In some more embodiments, the glass composition may contain $Li_2O$ in an amount greater than or equal to 0.0 mol. % and less than or equal to 25.0 mol. %, greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 6.5 mol. %, greater than or equal to 0.0 mol. % and less than or equal to 5.75 mol. %, greater than or equal to 0.3 mol. % and less than or equal to 20.0 mol. %, greater than or equal to 0.42 mol. % and less than or equal to 2.08 mol. %, greater than or equal to 0.0 mol. % and less than or equal to 2.1 mol. %, greater than or equal to 0.1 mol. % and less than or equal to 2.1 mol. %, greater than or equal to 0.3 mol. % and less than or equal to 2.1 mol. %, greater than or equal to 5.0 mol. % and less than or equal to 25.0 mol. %, greater than or equal to 5.0 mol. % and less than or equal to 5.75 mol. %, greater than or equal to 10.0 mol. % and less than or equal to 19.0 mol. %, greater than or equal to 19.0 mol. % and less than or equal to 20.0 mol. %.

Glass composition may include sodium oxide ($Na_2O$). In high-index glasses, $Na_2O$ acts like $K_2O$, improving the solubility of high-index components, such as $TiO_2$, $Nb_2O_5$, $WO_3$ and others, but, at the same time, $Na_2O$ itself acts to decrease the refractive index of glasses. In most cases, the effect of $Na_2O$ on solubility of high-index components was found to be a little bit lower than the corresponding effect of $K_2O$. However, $Na_2O$ provides lower thermal expansion coefficient than $K_2O$, which may reduce the thermal stresses formed when cooling the glass articles and, therefore, improve the quality of the articles. In embodiments, the glass composition may contain sodium oxide ($Na_2O$) in an amount from greater than or equal to 0.0 mol. % to less than or equal to 20.0 mol. % and all ranges and sub-ranges between the foregoing values. In some embodiments, the glass composition may contain $Na_2O$ in an amount greater than or equal to 0.0 mol. %, greater than or equal to 5.0 mol. %, greater than or equal to 10.0 mol. %, greater than or equal to 14.0 mol. %, greater than or equal to 16.0 mol. %, or greater than or equal to 18.0 mol. %. In some other embodiments, the glass composition may contain $Na_2O$ in an amount less than or equal to 20.0 mol. %, less than or equal to 18.0 mol. %, less than or equal to 16.0 mol. %, less than or equal to 14.0 mol. %, less than or equal to 10.0 mol. %, less than or equal to 7.5 mol. %, less than or equal to 6.5 mol. %, less than or equal to 5.75 mol. %, or less than or equal to 5.0 mol. %. In some more embodiments, the glass composition may contain $Na_2O$ in an amount greater than or equal to 0.0 mol. % and less than or equal to 20.0 mol. %, greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 6.5 mol. %, greater than or equal to 0.0 mol. % and less than or equal to 5.75 mol. %, greater than or equal to 0.03 mol. % and less than or equal to 4.97 mol. %, greater than or equal to 0.0 mol. % and less than or equal to 5.0 mol. %.

Glass composition may include divalent metal oxides (RO). Divalent metal oxides, such as alkaline earth metal oxides (BeO, MgO, CaO, SrO and BaO), zinc oxide (ZnO), cadmium oxide (CdO), lead oxide (PbO) and others, when present in a glass, provide higher refractive indexes than most monovalent oxides. Some divalent metal oxides, such as, for example, CaO, SrO and ZnO, also provide comparably low density, therefore, increasing the ratio of the refractive index to density and, accordingly, increasing the performance of optical glasses. In addition, divalent metal oxides may help to increase the solubility of the high-index components, such as $TiO_2$, $Nb_2O_5$ and $WO_3$, which leads to a further increase in refractive index at a given density. However, when adding at high amounts, divalent metal oxides may cause crystallization of refractory minerals from the melts or liquid-liquid phase separation, which may reduce the glass-forming ability of glasses. Accordingly, the amount of divalent metal oxides in glass compositions of the present disclosure is limited.

In some embodiments, the glass composition may contain divalent metal oxides RO in an amount greater than or equal to 0.3 mol. %, greater than or equal to 0.5 mol. %, greater than or equal to 10.0 mol. %, or greater than or equal to 20.0 mol. %. In some other embodiments, the glass composition may contain divalent metal oxides RO in an amount less than or equal to 30.0 mol. %, less than or equal to 20.0 mol. %, or less than or equal to 10.0 mol. %. In some more embodiments, the glass composition may contain RO in an amount greater than or equal to 0.3 mol. % and less than or equal to 20.0 mol. %, greater than or equal to 0.5 mol. % and less than or equal to 30.0 mol. %, greater than or equal to 0.3 mol. % and less than or equal to 30.0 mol. %, or greater than or equal to 0.3 mol. % and less than or equal to 10.0 mol. %, greater than or equal to 0.5 mol. % and less than or equal to 20.0 mol. %, or greater than or equal to 0.5 mol. % and less than or equal to 10.0 mol. %, greater than or equal to 10.0 mol. % and less than or equal to 30.0 mol. %, or greater than or equal to 10.0 mol. % and less than or equal to 20.0 mol. %.

Glass composition may include barium oxide (BaO). Barium oxide may increase the solubility of high index components, such as $TiO_2$ and $Nb_2O_5$, which leads to an increase the refractive index at a given density. However, barium is a heavy element and, being added in a high amount, may increase the density of glass. Also, in high concentration, it may cause crystallization of minerals such as barium titanate ($BaTiO_3$), barium niobate ($BaNb_2O_6$), barium orthophosphate ($Ba_3P_2O_8$) and others. Accordingly, the amount of BaO in glasses is limited, or glasses may be substantially free of BaO. In embodiments, the glass composition may contain barium oxide (BaO) in an amount from greater than or equal to 0.0 mol. % to less than or equal to 20.0 mol. % and all ranges and sub-ranges between the foregoing values. In some embodiments, the glass composition may contain BaO in an amount greater than or equal to 0.0 mol. %, greater than or equal to 1.75 mol. %, greater than or equal to 3.0 mol. %, or greater than or equal to 10.0 mol. %. In some other embodiments, the glass composition may contain BaO in an amount less than or equal to 20.0 mol. %, less than or equal to 10.0 mol. %, less than or equal to 9.0 mol. %, or less than or equal to 8.0 mol. %. In some more embodiments, the glass composition may contain BaO in an amount greater than or equal to 0.0 mol. % and less than or equal to 20.0 mol. %, greater than or equal to 0.0 mol. % and less than or equal to 10.0 mol. %, greater than or equal to 0.0 mol. % and less than or equal to 9.0 mol. %, greater than or equal to 1.75 mol. % and less than or equal to 8.0 mol. %, greater than or equal to 2.59 mol. % and less than or equal to 8.99 mol. %, greater than or equal to 0.0 mol. % and less than or equal to 8.0 mol. %, greater than or equal to 1.75 mol. % and less than or equal to 20.0 mol. %, greater than or equal to 3.0 mol. % and less than or equal to 20.0 mol. %, greater than or equal to 3.0 mol. % and less than or equal to 8.0 mol. %.

Glass composition may include calcium oxide (CaO). Calcium oxide provides the highest ratio of the refractive index to density among the known monovalent and divalent metal oxides. Also, in some embodiments, CaO may help to increase the solubility of $Nb_2O_5$ and $TiO_2$, which additionally raises the refractive index at a given density. However, if the amount of CaO in a glass is too high, it may cause crystallization of refractory species, such as calcium titanates ($CaTiO_3$, $CaTi_2O_5$, etc.) calcium niobate ($CaNb_2O_6$), calcium metasilicate ($CaSiO_3$) and others. This effect may reduce the viscosity at liquidus temperature and, therefore, increase the critical cooling rate, which may cause crystallization of the melt when cooling. The amount of CaO is accordingly limited. In embodiments, the glass composition may contain calcium oxide (CaO) in an amount from greater than or equal to 0.0 mol. % to less than or equal to 17.0 mol. % and all ranges and sub-ranges between the foregoing values. In some embodiments, the glass composition may contain CaO in an amount greater than or equal to 0.0 mol. %, greater than or equal to 1.0 mol. %, or greater than or equal to 10.0 mol. %. In some other embodiments, the glass composition may contain CaO in an amount less than or equal to 17.0 mol. %, less than or equal to 10.0 mol. %, or less than or equal to 9.0 mol. %. In some more embodiments, the glass composition may contain CaO in an amount greater than or equal to 0.0 mol. % and less than or equal to 10.0 mol. %, greater than or equal to 0.0 mol. % and less than or equal to 9.0 mol. %, greater than or equal to 0.97 mol. % and less than or equal to 8.99 mol. %, greater than or equal to 0.0 mol. % and less than or equal to 17.0 mol. %, greater than or equal to 1.0 mol. % and less than or equal to 17.0 mol. %, greater than or equal to 1.0 mol. % and less than or equal to 9.0 mol. %.

Glass composition may include vanadia ($V_2O_5$). Vanadia provides the highest ratio of the refractive index to density among all oxides. However, vanadia may cause undesirable dark or even black coloring and may also raise ecology concerns. For these reasons, the content of vanadia in the glasses is limited, or glass compositions may be free of $V_2O_5$. In embodiments, the glass composition may contain vanadia ($V_2O_5$) in an amount from greater than or equal to 0.0 mol. % to less than or equal to 5.0 mol. % and all ranges and sub-ranges between the foregoing values. In some other embodiments, the glass composition may contain $V_2O_5$ in an amount less than or equal to 5.0 mol. %, less than or equal to 2.5 mol. %, or less than or equal to 1.0 mol. %. In some more embodiments, the glass composition may contain $V_2O_5$ in an amount greater than or equal to 0.0 mol. % and less than or equal to 1.0 mol. %, greater than or equal to 0.0 mol. % and less than or equal to 5.0 mol. %.

Glass composition may include tungsten oxide ($WO_3$). $WO_3$ provides high refractive index without significantly increasing density or causing undesirable coloring. However, at high content of $WO_3$ the liquidus temperature tends to rise and the viscosity at the liquidus temperature drops, making it difficult to avoid crystallization of melts when cooling. Accordingly, the content of tungsten oxide should be limited, or glass compositions may be free of $WO_3$. In embodiments, the glass composition may contain tungsten oxide ($WO_3$) in an amount from greater than or equal to 0.0 mol. % to less than or equal to 10.0 mol. % and all ranges and sub-ranges between the foregoing values. In some embodiments, the glass composition may contain $WO_3$ in an amount greater than or equal to 0.0 mol. %, greater than or equal to 3.93 mol. %, greater than or equal to 5.0 mol. %, greater than or equal to 7.0 mol. %, greater than or equal to 8.0 mol. %, or greater than or equal to 9.0 mol. %. In some other embodiments, the glass composition may contain $WO_3$ in an amount less than or equal to 10.0 mol. %, less than or equal to 9.0 mol. %, less than or equal to 8.0 mol. %, less than or equal to 7.5 mol. %, less than or equal to 7.0 mol. %, less than or equal to 6.5 mol. %, less than or equal to 6.0 mol. %, less than or equal to 5.0 mol. %, or less than or equal to 4.8 mol. %. In some more embodiments, the glass composition may contain $WO_3$ in an amount greater than or equal to 0.0 mol. % and less than or equal to 10.0 mol. %, greater than or equal to 0.0 mol. % and less than or equal to 7.5 mol. %, greater than or equal to 0.0 mol. % and less than or equal to 6.5 mol. %, greater than or equal to 0.0 mol. % and less than or equal to 6.0 mol. %, greater than or equal to 3.93 mol. % and less than or equal to 4.8 mol. %, greater than or equal to 0.0 mol. % and less than or equal to 4.8 mol. %, greater than or equal to 5.0 mol. % and less than or equal to 6.0 mol. %, greater than or equal to 8.0 mol. % and less than or equal to 9.0 mol. %.

Glass composition may include bismuth oxide ($Bi_2O_3$). $Bi_2O_3$ provides very high refractive index, but leads to an increase in density. However, it may also decrease the viscosity of melts at high temperatures, which may cause crystallization of melts when cooling. This effect is especially significant at high content of $Bi_2O_3$. Accordingly, the content of bismuth oxide should be limited. In embodiments, the glass composition may contain bismuth oxide ($Bi_2O_3$) in an amount from greater than or equal to 4.0 mol. % to less than or equal to 50.0 mol. % and all ranges and sub-ranges between the foregoing values. In some embodiments, the glass composition may contain $Bi_2O_3$ in an amount greater than or equal to 4.0 mol. %, greater than or equal to 4.5 mol. %, greater than or equal to 5.0 mol. %, greater than or equal to 10.0 mol. %, greater than or equal to 25.0 mol. %, greater than or equal to 35.0 mol. %, greater than or equal to 40.0 mol. %, or greater than or equal to 45.0 mol. %. In some other embodiments, the glass composition may contain $Bi_2O_3$ in an amount less than or equal to 50.0 mol. %, less than or equal to 45.0 mol. %, less than or equal to 40.0 mol. %, less than or equal to 35.0 mol. %, less than or equal to 30.0 mol. %, less than or equal to 25.0 mol. %, less than or equal to 23.0 mol. %, or less than or equal to 10.0 mol. %. In some more embodiments, the glass composition may contain $Bi_2O_3$ in an amount greater than or equal to 4.0 mol. % and less than or equal to 30.0 mol. %, greater than or equal to 4.5 mol. % and less than or equal to 50.0 mol. %, greater than or equal to 4.5 mol. % and less than or equal to 35.0 mol. %, greater than or equal to 5.0 mol. % and less than or equal to 30.0 mol. %, greater than or equal to 5.0 mol. % and less than or equal to 25.0 mol. %, greater than or equal to 5.0 mol. % and less than or equal to 23.0 mol. %, greater than or equal to 4.0 mol. % and less than or equal to 50.0 mol. %, greater than or equal to 4.5 mol. % and less than or equal to 10.0 mol. %, greater than or equal to 10.0 mol. % and less than or equal to 50.0 mol. %, greater than or equal to 10.0 mol. % and less than or equal to 23.0 mol. %, greater than or equal to 25.0 mol. % and less than or equal to 50.0 mol. %, greater than or equal to 25.0 mol. % and less than or equal to 30.0 mol. %.

Glass composition may include titania ($TiO_2$). High refractive index glasses typically include species, such as $TiO_2$ and $Nb_2O_5$, that absorb at least a portion of visible light, particularly at blue and near-UV regions wavelengths. In embodiments of the present disclosure, the transmittance of the glass may be characterized for different wavelengths within the range of from about 300 nm to 2300 nm. High transmission in the visible and near-UV range (blue region) is particularly desirable in some applications. High transmittance in the blue can be challenging to achieve in high refractive index glasses. High level of $TiO_2$ and/or $Nb_2O_5$ that are typically used in glasses to increase refractive index tend to decrease the transmittance in the near-UV region and shift the UV cut-off to higher wavelengths. Accordingly, the amount of $TiO_2$ is limited, or the glass compositions may be substantially free from $TiO_2$. In embodiments, the glass composition may contain titania ($TiO_2$) in an amount from greater than or equal to 0.0 mol. % to less than or equal to 55.0 mol. % and all ranges and sub-ranges between the foregoing values. In some embodiments, the glass composition may contain $TiO_2$ in an amount greater than or equal to 0.0 mol. %, greater than or equal to 0.3 mol. %, greater than or equal to 0.5 mol. %, greater than or equal to 7.0 mol. %, greater than or equal to 10.0 mol. %, greater than or equal to 13.0 mol. %, greater than or equal to 14.0 mol. %, greater than or equal to 25.0 mol. %, greater than or equal to 40.0 mol. %, greater than or equal to 45.0 mol. %, or greater than or equal to 50.0 mol. %. In some other embodiments, the glass composition may contain $TiO_2$ in an amount less than or equal to 55.0 mol. %, less than or equal to 50.0 mol. %, less than or equal to 45.0 mol. %, less than or equal to 40.0 mol. %, less than or equal to 36.0 mol. %, less than or equal to 33.0 mol. %, less than or equal to 30.0 mol. %, less than or equal to 25.0 mol. %, or less than or equal to 10.0 mol. %. In some more embodiments, the glass composition may contain $TiO_2$ in an amount greater than or equal to 0.0 mol. % and less than or equal to 50.0 mol. %, greater than or equal to 0.3 mol. % and less than or equal to 40.0 mol. %, greater than or equal to 0.5 mol. % and less than or equal to 55.0 mol. %, greater than or equal to 7.0 mol. % and less than or equal to 40.0 mol. %, greater than or equal to 10.0 mol. % and less than or equal to 36.0 mol. %, greater than or equal to 13.0 mol. % and less than or equal to 33.0 mol. %, greater than or equal to 13.7 mol. % and less than or equal to 30.23 mol. %, greater than or equal to 0.0 mol. % and less than or equal to 55.0 mol. %, greater than or equal to 0.0 mol. % and less than or equal to 10.0 mol. %, greater than or equal to 0.3 mol. % and less than or equal to 10.0 mol. %, greater than or equal to 0.5 mol. % and less than or equal to 10.0 mol. %, greater than or equal to 7.0 mol. % and less than or equal to 55.0 mol. %, greater than or equal to 7.0 mol. % and less than or equal to 10.0 mol. %, greater than or equal to 10.0 mol. % and less than or equal to 25.0 mol. %, greater than or equal to 13.0 mol. % and less than or equal to 25.0 mol. %, greater than or equal to 14.0 mol. % and less than or equal to 25.0 mol. %.

Glass composition may include niobia ($Nb_2O_5$). Niobia, like titania, can be used to increase the refractive index of glass while also maintaining a low density. However, niobia can introduce a yellow coloring to the glass that cannot be bleached in the same manner as titania, which can result in a loss of transmittance, particularly in the blue and UV range. Niobia, like titania, may cause crystallization and/or phase separation of the melt. In some embodiments, the glasses may be substantially free of $Nb_2O_5$. In embodiments, the glass composition may contain niobia ($Nb_2O_5$) in an amount from greater than or equal to 0.0 mol. % to less than or equal to 55.0 mol. % and all ranges and sub-ranges between the foregoing values. In some embodiments, the glass composition may contain $Nb_2O_5$ in an amount greater than or equal to 0.0 mol. %, greater than or equal to 0.5 mol. %, greater than or equal to 7.0 mol. %, greater than or equal to 10.0 mol. %, greater than or equal to 14.0 mol. %, greater than or equal to 16.5 mol. %, greater than or equal to 19.0 mol. %, greater than or equal to 25.0 mol. %, greater than or equal to 40.0 mol. %, greater than or equal to 45.0 mol. %, or greater than or equal to 50.0 mol. %. In some other embodiments, the glass composition may contain $Nb_2O_5$ in an amount less than or equal to 55.0 mol. %, less than or equal to 50.0 mol. %, less than or equal to 45.0 mol. %, less than or equal to 40.0 mol. %, less than or equal to 33.0 mol. %, less than or equal to 30.5 mol. %, less than or equal to 29.0 mol. %, less than or equal to 25.0 mol. %, or less than or equal to 10.0 mol. %. In some more embodiments, the glass composition may contain $Nb_2O_5$ in an amount greater than or equal to 0.0 mol. % and less than or equal to 50.0 mol. %, greater than or equal to 0.5 mol. % and less than or equal to 55.0 mol. %, greater than or equal to 7.0 mol. % and less than or equal to 40.0 mol. %, greater than or equal to 10.0 mol. % and less than or equal to 40.0 mol. %, greater than or equal to 14.0 mol. % and less than or equal to 33.0 mol. %, greater than or equal to 16.5 mol. % and less than or equal to 30.5 mol. %, greater than or equal to 18.83 mol. % and less than or equal to 28.82 mol. %, greater than or equal to 0.0 mol. % and less than or equal to 55.0 mol. %, greater than or equal to 0.0 mol. % and less than or equal to 10.0 mol. %, greater than or equal to 0.5 mol. % and less than or equal to 10.0 mol. %, greater than or equal to 7.0 mol. % and less than or equal to 55.0 mol. %, greater than or equal to 7.0 mol. % and less than or equal to 10.0 mol. %, greater than or equal to 14.0 mol. % and less than or equal to 55.0 mol. %, greater than or equal to 14.0 mol. % and less than or equal to 25.0 mol. %, greater than or equal to 16.5 mol. % and less than or equal to 25.0 mol. %, greater than or equal to 19.0 mol. % and less than or equal to 25.0 mol. %.

In some embodiments, the glass composition may have a sum of $GeO_2+TeO_2$ greater than or equal to 0.0 mol. %, greater than or equal to 10.0 mol. %, or greater than or equal to 20.0 mol. %. In some other embodiments, the glass composition may have a sum of $GeO_2+TeO_2$ less than or equal to 25.0 mol. %, less than or equal to 20.0 mol. %, or less than or equal to 10.0 mol. %. In some more embodiments, the glass composition may have a sum of $GeO_2+TeO_2$ greater than or equal to 0.0 mol. % and less than or equal to 25.0 mol. %, greater than or equal to 0.0 mol. % and less than or equal to 20.0 mol. %, or greater than or equal to 0.0 mol. % and less than or equal to 10.0 mol. %, greater than or equal to 10.0 mol. % and less than or equal to 25.0 mol. %, or greater than or equal to 10.0 mol. % and less than or equal to 20.0 mol. %.

In some embodiments, the glass composition may have a sum of $Na_2O+K_2O$ greater than or equal to 0.0 mol. %, or greater than or equal to 0.3 mol. %.

In some embodiments, the glass composition may have a sum of $P_2O_5+B_2O_3$ greater than or equal to 0.0 mol. %, or greater than or equal to 20.0 mol. %. In some other embodiments, the glass composition may have a sum of $P_2O_5+B_2O_3$ less than or equal to 35.0 mol. % or less than or equal to 20.0 mol. %. In some more embodiments, the glass composition may have a sum of $P_2O_5+B_2O_3$ greater than or equal to 20.0 mol. % and less than or equal to 35.0 mol. %, greater than or equal to 0.0 mol. % and less than or equal to 35.0 mol. %, or greater than or equal to 0.0 mol. % and less than or equal to 20.0 mol. %.

In some embodiments, the glass composition may have a sum of $TiO_2+Nb_2O_5$ greater than or equal to 0.0 mol. %, greater than or equal to 25.0 mol. %, greater than or equal to 36.0 mol. %, or greater than or equal to 50.0 mol. %. In some other embodiments, the glass composition may have a sum of $TiO_2+Nb_2O_5$ less than or equal to 70.0 mol. %, less than or equal to 58.0 mol. %, or less than or equal to 50.0 mol. %. In some more embodiments, the glass composition may have a sum of $TiO_2+Nb_2O_5$ greater than or equal to 25.0 mol. % and less than or equal to 70.0 mol. %, greater than or equal to 0.0 mol. % and less than or equal to 70.0 mol. %, greater than or equal to 0.0 mol. % and less than or equal to 58.0 mol. %, or greater than or equal to 0.0 mol. % and less than or equal to 50.0 mol. %, greater than or equal to 25.0 mol. % and less than or equal to 58.0 mol. %, or greater than or equal to 25.0 mol. % and less than or equal to 50.0 mol. %, greater than or equal to 36.0 mol. % and less than or equal to 70.0 mol. %, greater than or equal to 36.0 mol. % and less than or equal to 58.0 mol. %, or greater than or equal to 36.0 mol. % and less than or equal to 50.0 mol. %.

In some embodiments, glass composition may have limitations for a difference $Alk_2O+RO+Bi_2O_3+3*Al_2O_3-P_2O_5$. When the difference ($Alk_2O+RO+Bi_2O_3+3*Al_2O_3-P_2O_5$) is zero or positive, i.e., the total content of $Alk_2O$, $RO$, $Bi_2O_3$ and triple the content of $Al_2O_3$ is equal to or greater than the content of $P_2O_5$ in glass, it is possible to melt the glass from solid materials, such as metaphosphates ($KPO_3$, $NaPO_3$, $BaP_2O_6$, $BiPO_4$, $AlP_3O_9$, etc.), which simplifies the melting process and reduces the cost. When the difference ($Alk_2O+RO+Bi_2O_3+3*Al_2O_3-P_2O_5$) is negative, it is typically necessary to either use liquid starting materials, such as phosphoric acid ($H_3PO_4$), which makes the process more complicated and more expensive, or use more expensive solid materials, such as, for example, titanium phosphate ($TiP_2O_7$), which also increases the cost of starting materials. Accordingly, it is preferable to have the difference ($Alk_2O+RO+Bi_2O_3+3*Al_2O_3-P_2O_5$) positive or zero. In some embodiments, the glass may have a difference $Alk_2O+RO+Bi_2O_3+3*Al_2O_3-P_2O_5$ greater than or equal to −8 mol. %, greater than or equal to 0.000 mol. %, or greater than or equal to 10 mol. %. In some other embodiments, the glass may have a difference $Alk_2O+RO+Bi_2O_3+3*Al_2O_3-P_2O_5$ less than or equal to 11 mol. %, less than or equal to 10 mol. %, or less than or equal to 0.000 mol. %. In some more embodiments, the glass may have a difference $Alk_2O+RO+Bi_2O_3+3*Al_2O_3-P_2O_5$ greater than or equal to −8 mol. % and less than or equal to 11 mol. %, greater than or equal to −8 mol. % and less than or equal to 10 mol. %, or greater than or equal to −8 mol. % and less than or equal to 0.000 mol. %, greater than or equal to 0.000 mol. % and less than or equal to 11 mol. %, or greater than or equal to 0.000 mol. % and less than or equal to 10 mol. %.

In some embodiments, the glass may have a refractive index at 587.56 nm $n_d$ greater than or equal to 1.8 or greater than or equal to 1.9, or greater than or equal to 2.0.

In some embodiments, the glass may have an Abbe number $v_d$ less than or equal to 20.0 or less than or equal to 19.5, or less than or equal to 19.0, or less than or equal to 18.5.

In some embodiments, the glass may have a glass transition temperature $T_g$ from greater than or equal to 550° C. to less than or equal to 650° C. and all ranges and sub-ranges between the foregoing values. In some embodiments, the glass may have a glass transition temperature $T_g$ greater than or equal to 550° C., greater than or equal to 560° C., greater than or equal to 590° C., greater than or equal to 620° C., greater than or equal to 630° C., or greater than or equal to 640° C. In some other embodiments, the glass may have a glass transition temperature $T_g$ less than or equal to 650° C., less than or equal to 640° C., less than or equal to 630° C., less than or equal to 620° C., less than or equal to 590° C., or less than or equal to 560° C. In some more embodiments, the glass may have a glass transition temperature $T_g$ greater than or equal to 550° C. and less than or equal to 650° C., greater than or equal to 550° C. and less than or equal to 560° C., greater than or equal to 560° C. and less than or equal to 650° C., greater than or equal to 560° C. and less than or equal to 590° C., greater than or equal to 590° C. and less than or equal to 650° C., greater than or equal to 590° C. and less than or equal to 620° C., greater than or equal to 620° C. and less than or equal to 650° C., greater than or equal to 620° C. and less than or equal to 630° C., greater than or equal to 630° C. and less than or equal to 650° C., greater than or equal to 630° C. and less than or equal to 640° C.

In some embodiments, the glass may have a refractive index to density ratio ("refraction") $(n_d-1)/d_{RT}$ greater than or equal to 0.20 or greater than or equal to 0.22, or greater than or equal to 0.24.

In some embodiments, the glass may have the density at room temperature $d_{RT}$ less than or equal to 5.5 g/cm³, or less than or equal to 5.2 g/cm³ or less than or equal to 5.0 g/cm³, or less than or equal to 4.8 g/cm³, or less than or equal to 4.6 g/cm³, less than or equal to 4.4 g/cm³, or less than or equal to 4.2 g/cm³.

In some embodiments, the glass may have a quantity $n_d-(1.14+0.192*d_{RT})$ greater than or equal to 0.000.

In some embodiments, the glass may have a quantity $n_d-(1.205+0.192*d_{RT})$ greater than or equal to 0.000.

Refractive index $n_d$ and density $d_{RT}$ are properties of glass that can be predicted from the glass composition. A linear regression analysis of the Exemplary Glasses of the present disclosure in the EXAMPLES section below and other glass compositions reported in the literature was performed to determine equations that can predict the composition dependences of the refractive index $n_d$ and the density $d_{RT}$.

The training dataset of glass compositions satisfying the compositional limitations specified in Table 1 below and having measured values of the properties of interest ($n_d$ and $d_{RT}$), about 100 glass compositions for each property ($n_d$ and $d_{RT}$), were randomly selected from literature data presented in the publicly available SciGlass Information System database and from the Exemplary Glasses from the embodiments presented herein. The linear regression analysis on the above-specified dataset, with the exclusion of outliers, was used to determine the formulas (I) and (II) presented in Table 2 below for predictive parameters $P_n$ and $P_d$ that predict $n_d$ and $d_{RT}$, respectively. Another subset of glass compositions satisfying the compositional limitations of Table 1 was used as a validation set to evaluate the ability to interpolate within the compositional limitations of Table 1 and was used to establish the standard deviations specified in Table 2 for the predictive parameters $P_n$ and $P_d$. An external dataset of prior art glass compositions, also randomly selected from the SciGlass Information System database, was used to evaluate the ability to predict the properties ($n_d$ and $d_{RT}$) outside of the compositional limits of Table 1 with reasonable accuracy. Multiple iterations of this process were performed in order to determine the best formula for predicting each property ($n_d$ and $d_{RT}$). Formulas (I) and (II) in Table 2 are the result of the analysis.

The data for the Comparative Glass compositions used in the linear regression modeling, including the training dataset, validation dataset and external dataset were obtained from the publically available SciGlass Information System database. Formulas (I) and (II) below were obtained from the linear regression analysis:

$$P_n = 1.865 - 0.0052736*P_2O_5 + 0.0071201*Nb_2O_5 + 0.0031659*TiO_2 - 0.0008032*BaO - 0.0047736*K_2O - 0.00076807*CaO - 0.0027991*Na_2O - 0.0016514*Li_2O - 0.00069646*SrO + 0.0032628*WO_3 + 0.007519*Bi_2O_3 - 0.0040698*B_2O_3 - 0.0035951*SiO_2 - 0.00067102*ZnO + 0.0022313*ZrO_2 - 0.0019531*MgO - 0.003506*Al_2O_3 + 0.0019216*TeO_2 + 0.0025766*PbO - 0.0018844*GeO_2 + 0.0065444*Tl_2O + 0.0052048*Ag_2O,$$  (I)

$$P_d = 4.45 - 0.020780*Al_2O_3 - 0.020918*B_2O_3 + 0.014152*BaO + 0.061008*Bi_2O_3 - 0.0067411*CaO + 0.013529*CdO + 0.012560*Cs_2O + 0.0028892*Ga_2O_3 - 0.0057012*GeO_2 - 0.017838*K_2O + 0.046524*La_2O_3 - 0.013919*Li_2O - 0.010279*MgO - 0.0064231*MoO_3 - 0.012983*Na_2O + 0.0083294*Nb_2O_5 - 0.028926*P_2O_5 + 0.031742*PbO - 0.019022*SiO_2 + 0.0045214*SrO + 0.050158*Ta_2O_5 + 0.0088486*TeO_2 - 0.0063053*TiO_2 - 0.018941*V_2O_5 + 0.027483*WO_3 - 0.0010277*ZnO + 0.0100487*ZrO_2.$$  (II)

In Formulas (I) and (II) and Tables 1 and 2, $P_n$ is a predictive parameter that predicts the refractive index at 587.56 nm, $n_d$, and is calculated from the components of the glass composition expressed in mol. %, and $P_d$ is a predictive parameter that predicts the density at room temperature, $d_{RT}$, calculated from the components of the glass composition expressed in mol. %.

In Formulas (I) and (II), each component of the glass composition is listed in terms of its chemical formula, where the chemical formula refers to the concentration of the component expressed in mol. %. For example, for purposes of Formulas (I) and (II), $P_2O_5$ refers to the concentration of $P_2O_5$, expressed in mol. %, in the glass composition. It is understood that not all components listed in Formulas (I) and (II) are necessarily present in a particular glass compo-

TABLE 1

| | | | | |
|---|---|---|---|---|
| Composition Space Used for Modeling | | | | |
| | Property | | | |
| | $n_d$ | | $d_{RT}$ | |
| Component limits | Min, mol. % | Max, mol. % | Min, mol. % | Max, mol. % |
| $P_2O_5$ | 10 | 30 | 10 | 30 |
| $Nb_2O_5$ | 5 | 70 | 5 | 70 |
| $TiO_2$ | 5 | 50 | 5 | 50 |
| $Bi_2O_3$ | 1 | 90 | 1 | 90 |
| CaO | 0 | 40 | 0 | 40 |
| $Na_2O$ | 0 | 30 | 0 | 30 |
| SrO | 0 | 30 | 0 | 30 |
| $K_2O$ | 0 | 20 | 0 | 20 |
| BaO | 0 | 20 | 0 | 20 |
| $SiO_2$ | 0 | 20 | 0 | 20 |
| ZnO | 0 | 20 | 0 | 20 |
| $B_2O_3$ | 0 | 20 | 0 | 20 |
| $WO_3$ | 0 | 15 | 0 | 15 |
| $Li_2O$ | 0 | 10 | 0 | 10 |
| $ZrO_2$ | 0 | 10 | 0 | 10 |
| MgO | 0 | 10 | 0 | 10 |
| $R_mO_n$ | 99 | Not limited | 99 | Not limited |
| $TiO_2 + Nb_2O_5 + WO_3 + Bi_2O_3 + TeO_2$ | 40 | Not limited | 40 | Not limited |
| $TiO_2 + Nb_2O_5 + Bi_2O_3$ | 30 | Not limited | 30 | Not limited |
| $P_2O_5 - SiO_2$ | 10 | Not limited | 10 | Not limited |
| Other species | 0 | Not limited | 0 | Not limited |

TABLE 2

| | | | | | | |
|---|---|---|---|---|---|---|
| Property prediction models | | | | | | |
| Property | Abbreviation | Unit | Predicting Parameter | Regression Formula | Composition Unit | Standard Deviation |
| Refractive index at 587.56 nm | $n_d$ | | $P_n$ | Formula (I) | Mol. % | 0.015 |
| Density at room temperature | $d_{RT}$ | g/cm³ | $P_d$ | Formula (II) | Mol. % | 0.075 | sition and that Formulas (I) and (II) are equally valid for glass compositions that contain less than all of the components listed in the formulas. It is further understood that Formulas (I) and (II) are also valid for glass compositions within the scope and claims of the present disclosure that contain components in addition to the components listed in the formulas. If a component listed in Formulas (I) and (II) is absent in a particular glass composition, the concentration of the component in the glass composition is 0 mol. % and the contribution of the component to the value calculated from the formulas is zero. In Table 1, $R_mO_n$ is a total sum of all oxides.

FIG. 1 is a plot of the parameter $P_n$ calculated by Formula (I) as a function of measured refractive index $n_d$ for some Comparative Glasses ("Comp. Glasses") taken from the literature and some Exemplary Glasses ("Ex. Glasses"). As illustrated by the data in FIG. 1, the compositional dependence of the parameter $P_n$ had a standard deviation within a range of ±0.015 unit of the measured $n_d$ for the majority of glasses, which corresponds to the standard error specified in Table 2.

Figure 2:
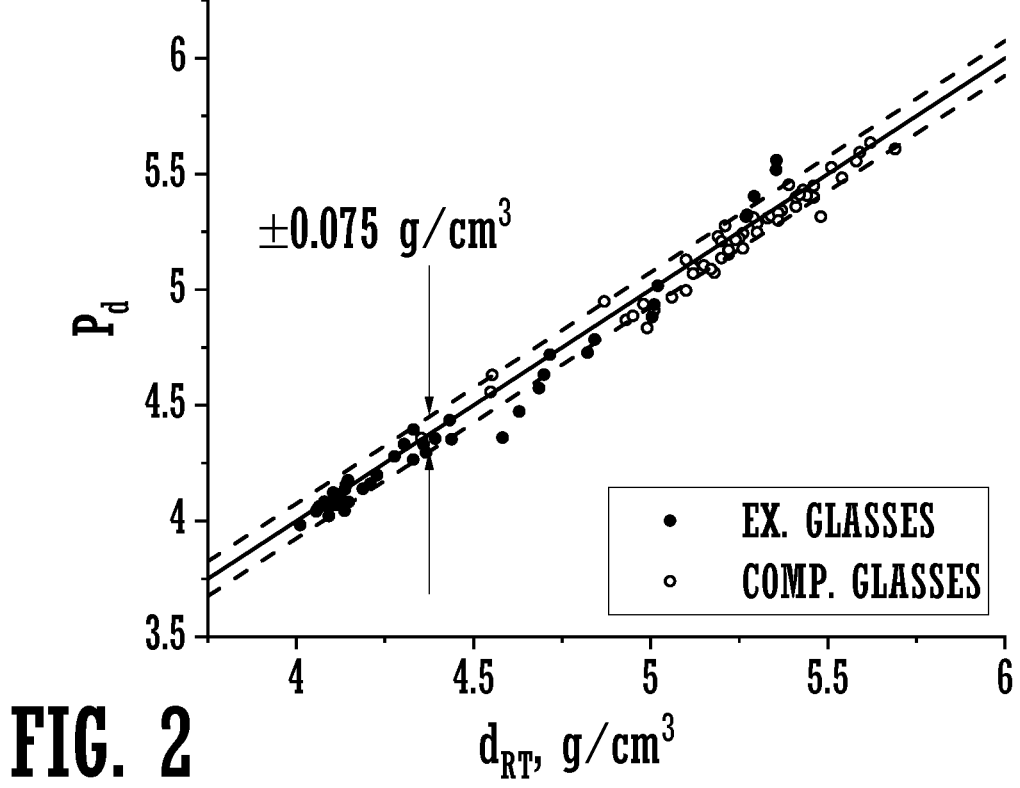
FIG. 2 is a plot illustrating the relationship between the density $d_{RT}$ and the density parameter $P_d$ calculated by formula (II) for some Comparative Glasses and some Exemplary Glasses according to an embodiment of the present disclosure.

FIG. 2 is a plot of the parameter $P_d$ calculated by Formula (II) as a function of measured density $d_{RT}$ for some Literature Glasses ("Comp. Glasses") and some Exemplary Glasses ("Ex. Glasses"). As illustrated by the data in FIG. 2, the compositional dependence of the parameter $P_d$ had a standard deviation within a range of ±0.075 unit of the measured $d_{RT}$ for the majority of glasses, which corresponds to the standard deviation specified in Table 2.

Table 3 identifies the combination of components and their respective amounts according to some embodiments of the present disclosure. The Exemplary Glasses A in Table 3 may include additional components according to any aspects of the present disclosure as described herein.

TABLE 3

| Exemplary Glasses A | |
|---|---|
| Component | Amount (mol. %) |
| $P_2O_5$ | 15.9 to 50.0 mol. % |
| $Bi_2O_3$ | 4.5 to 50.0 mol. % |
| $TiO_2$ | 0.0 to 50.0 mol. % |
| $Nb_2O_5$ | 0.0 to 50.0 mol. % |
| $Li_2O$ | 0.0 to 25.0 mol. % |
| $K_2O$ | 0.0 to 25.0 mol. % |
| $Na_2O$ | 0.0 to 20.0 mol. % |
| $WO_3$ | 0.0 to 6.0 mol. % |
| Sum of $(TiO_2 + Nb_2O_5)$ | 25.0 to 70.0 mol. % |
| Total sum of alkali metal oxides $Alk_2O$ | 0.5 to 30.0 mol. % |
| Total sum of divalent metal oxides RO | 0.5 to 30.0 mol. % |
| Sum of $(GeO_2 + TeO_2)$ | 0.0 to 25.0 mol. % |

Exemplary Glasses A according to embodiments of the present disclosure may satisfy the following condition:

$$Alk_2O + RO + Bi_2O_3 + 3*Al_2O_3 - P_2O_5[\text{mol. }\%] \geq -8.0,$$

where chemical formulas refer to the amounts of components in glass, expressed in mol. %.

Table 4 identifies the combination of components and their respective amounts according to some embodiments of the present disclosure. The Exemplary Glasses B in Table 4 may include additional components according to any aspects of the present disclosure as described herein.

TABLE 4

| Exemplary Glasses B | |
|---|---|
| Component | Amount (mol. %) |
| $P_2O_5$ | 23.0 to 35.0 mol. % |
| $Bi_2O_3$ | 4.5 to 35.0 mol. % |
| $Nb_2O_5$ | 0.5 to 55.0 mol. % |
| $TiO_2$ | 0.5 to 55.0 mol. % |
| $Li_2O$ | 0.3 to 20.0 mol. % |

Exemplary Glasses B according to embodiments of the present disclosure may satisfy the following condition:

$$n_d - (1.14 + 0.192*d_{RT}) > 0.000,$$

where $n_d$ is a refractive index at 587.56 nm, and $d_{RT}$ is a density at room temperature.

According to some embodiments of the present disclosure, Exemplary Glasses B may also satisfy the following condition:

$$n_d - (1.205 + 0.192*d_{RT}) > 0.000,$$

where $n_d$ is a refractive index at 587.56 nm, and $d_{RT}$ is a density at room temperature.

EXAMPLES

The following examples describe various features and advantages provided by the disclosure, and are in no way intended to limit the invention and appended claims.

To prepare the glass samples for some exemplary glasses of the present disclosure, about 15 grams of each sample (content of target species was more than 99.99 wt %) was melted from batch raw materials at a temperature of about

22

Figure 3:
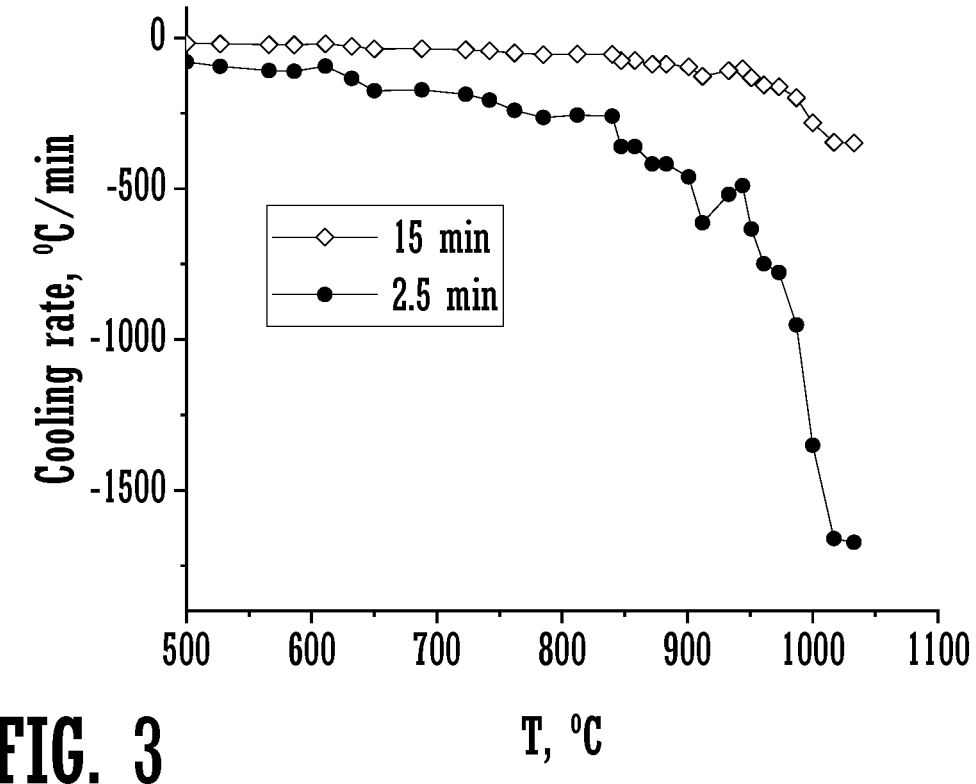
FIG. 3 is a plot of an exemplary cooling schedule according to a "15 min test" condition and a "2.5 min test" condition for some exemplary glasses according to an embodiment of the present disclosure.

1300° C. in platinum or platinum-rhodium crucibles (Pt: Rh=80:20) for 1 hour. One of two controlled cooling conditions were applied. In the first condition (referred to as "15 min test"), it takes about 15 min for the samples to cool from 1100° C. to 500° C. inside a furnace. In the second condition (referred to as "2.5 min test"), it takes about 2.5 min for the samples to cool from 1100° C. to 500° C. Temperature readings were obtained by direct reading of the furnace temperature or using an IR camera reading with calibration scaling. The first condition (15 min test) approximately corresponds to the cooling rate of up to 300° C./min at a temperature of 1000° C. and the second test approximately corresponds to the cooling rate of up to 600° C./min at 1000° C. The temperature of 1000° C. corresponds approximately to the temperature at which the cooling rate was expected to approach a maximum. When the temperature is lower, the cooling rate also decreases significantly. Typical schedules of the first and second cooling regimes are shown in FIG. 3. For these samples, in the Table 5, observations referred to as "15-min devit test" and "2.5-min devit test", are specified; the observation "1" is used to indicate that a glass composition passed a corresponding test, where a composition is deemed to have passed the indicated devit test if a melt of the composition forms a glass free of crystals visible under an optical microscope under magnification from 100× to 500×. The observation "0" is used to denote that a glass composition failed the indicated devit test.

To prepare other glass samples for exemplary glasses of the present disclosure, unless otherwise specified, a one kilogram batch was prepared in a pure platinum crucible. The crucible was placed in a furnace set at a temperature of 1250° C., the temperature in the furnace was then raised to 1300° C. and held at 1300° C. for 2 hours. The furnace temperature was then reduced to 1250° C. and the glass was allowed to equilibrate at this temperature for an hour before being poured on a steel table and annealed at about Tg for an hour.

Some sample melts were also melted in a "one liter" platinum crucible heated by the Joule effect. In this process, approximately 3700 g of raw materials (components as batched) was used. The crucible was filled with the batch components in 1.5 hours at 1250° C. The temperature was then raised to 1300° C. and held for one hour. During this step, the glass was continuously stirred at 60 rpm. The temperature was then decreased to 1200° C. where it was allowed to equilibrate for 30 minutes and the stirring was continued at a rate of 20 rpm. A delivery tube was heated at 1225° C. and the glass melt was casted on a cooled graphite table to form the glass. The glass was formed into a bar of approximately 25 mm in thickness, 50 mm in width, and 90 cm in length. The bars were inspected under an optical microscope to check for crystallization and were all crystal free. The glass quality observed under the optical microscope was good with the bars being striae and bubble free. The glass was placed at about Tg in a lehr oven for 1 hour for a rough annealing. The bars were then annealed in a static furnace for one hour at about Tg and the temperature was then lowered at 1° C./min.

No chemical analysis of the tested samples was performed because chemical analysis was performed for similar samples prepared in independent meltings by XRF (X-ray fluorescence—for all oxides, except for $B_2O_3$ and $Li_2O$), by ICP (inductively coupled plasma mass spectrometry—for $B_2O_3$) and by FES (flame emission spectrometry—for $Li_2O$). These analyses gave deviations from the batched compositions within ±2.0 mass % for the major components.

Exemplary glass compositions are listed in Table 5. Comparative glass compositions are listed in Table 6. In Tables 5 and 6, the abbreviation "n" with a subscript refers to the refractive index at a corresponding wavelength in nm; for example, $n_{632.8\ nm}$ refers to the refractive index at wavelengths of 632.8 nm.

TABLE 5

| Exemplary Glass Compositions | | | | | | | | | |
| --- | --- | --- | --- | --- | --- | --- | --- | --- | --- |
| Exemplary Glass | | 1 | 2 | 3 | 4 | 5 | 6 | 7 | 8 |
| Composition-mol. % | | | | | | | | | |
| $TiO_2$ | mol. % | 19.99 | 18.59 | 17.54 | 16.46 | 15.00 | 25.21 | 23.01 | 23.18 |
| $Nb_2O_5$ | mol. % | 25.99 | 27.38 | 28.44 | 29.52 | 30.99 | 18.65 | 20.73 | 15.23 |
| $Bi_2O_3$ | mol. % | 5.00 | 5.00 | 5.00 | 5.00 | 5.00 | 6.11 | 6.22 | 11.54 |
| $P_2O_5$ | mol. % | 23.98 | 23.98 | 23.98 | 23.98 | 23.97 | 24.49 | 24.48 | 24.47 |
| BaO | mol. % | 8.01 | 8.00 | 8.01 | 8.01 | 8.01 | 9.00 | 9.00 | 9.00 |
| CaO | mol. % | 9.01 | 9.03 | 9.01 | 9.02 | 9.01 | 8.99 | 9.00 | 9.01 |
| $K_2O$ | mol. % | 8.00 | 7.99 | 7.99 | 7.99 | 7.99 | 7.49 | 7.50 | 7.50 |
| $Na_2O$ | mol. % | 0 | 0 | 0 | 0 | 0 | 0.0257 | 0.0263 | 0.028 |
| SrO | mol. % | 0 | 0 | 0 | 0 | 0 | 0.0153 | 0.0158 | 0.0335 |
| $Ta_2O_5$ | mol. % | 0.0227 | 0.0269 | 0.0272 | 0.0276 | 0.028 | 0.018 | 0.0185 | 0.0157 |
| Composition constraints | | | | | | | | | |
| $TiO_2$ + $Nb_2O_5$ | mol. % | 45.98 | 45.97 | 45.98 | 45.98 | 45.99 | 43.87 | 43.74 | 38.41 |
| $Alk_2O$ + RO + $Bi_2O_3$ + 3 * $Al_2O_3$ − $P_2O_5$ | mol. % | 6.038 | 6.041 | 6.031 | 6.047 | 6.034 | 7.133 | 7.275 | 12.63 |
| Measured properties | | | | | | | | | |
| $n_d$ | | | | | | | | | 1.969 |
| $d_{RT}$ | g/cm³ | 4.095 | 4.079 | 4.109 | 4.123 | 4.137 | 4.136 | 4.148 | 4.582 |
| $n_{632.8\ nm}$ | | | | | | | | | 1.9591 |
| $n_{531.9\ nm}$ | | | | | | | | | 1.9858 |
| $n_{F\ (486.13\ nm)}$ | | | | | | | | | 2.0056 |
| $v_d$ | | | | | | | | | 19.1 |
| $(n_d − 1)/d_{RT}$ | | | | | | | | | 0.21148 |
| 15-min devit test (0/1) | | 1 | 1 | 1 | 1 | 1 | 1 | 1 | 1 |
| Predicted and calculated properties | | | | | | | | | |
| $P_n$ [for $n_d$] | | 1.9729 | 1.9784 | 1.9827 | 1.9869 | 1.9928 | 1.9444 | 1.9531 | 1.9545 |
| $P_d$ [for $d_{RT}$] | g/cm³ | 4.0629 | 4.0831 | 4.099 | 4.1147 | 4.1365 | 4.0442 | 4.0824 | 4.3603 |
| $P_n$ − (1.14 + 0.192 * $P_d$) | | 0.0528 | 0.0544 | 0.0557 | 0.0569 | 0.0586 | 0.0279 | 0.0292 | −0.0227 |
| $P_n$ − (1.205 + 0.192 * $P_d$) | | −0.0122 | −0.0106 | −0.0093 | −0.0081 | −0.0064 | −0.0371 | −0.0358 | −0.0877 |
| Exemplary Glass | | 9 | 10 | 11 | 12 | 13 | 14 | 15 | 16 |
| Composition-mol. % | | | | | | | | | |
| $TiO_2$ | mol. % | 19.99 | 19.98 | 27.84 | 25.93 | 22.00 | 21.99 | 22.00 | 22.01 |
| $Nb_2O_5$ | mol. % | 23.13 | 17.18 | 15.71 | 11.87 | 27.01 | 27.00 | 27.01 | 27.01 |
| $Bi_2O_3$ | mol. % | 6.86 | 12.80 | 6.42 | 12.17 | 5.00 | 5.00 | 5.00 | 5.00 |
| $P_2O_5$ | mol. % | 24.48 | 24.48 | 24.48 | 24.48 | 24.84 | 24.85 | 24.85 | 24.85 |
| BaO | mol. % | 8.99 | 9.00 | 9.00 | 8.99 | 7.13 | 7.13 | 7.13 | 7.14 |
| CaO | mol. % | 8.98 | 8.99 | 8.99 | 8.99 | 7.00 | 6.99 | 6.99 | 6.99 |
| $K_2O$ | mol. % | 7.50 | 7.50 | 7.50 | 7.50 | 0 | 1.89 | 0 | 1.77 |
| $Li_2O$ | mol. % | 0 | 0 | 0 | 0 | 5.04 | 5.12 | 3.56 | 3.35 |
| $Na_2O$ | mol. % | 0.0275 | 0.0294 | 0.025 | 0.0274 | 1.95 | 0 | 3.43 | 1.86 |
| SrO | mol. % | 0.0164 | 0.0351 | 0.0149 | 0.0328 | 0 | 0 | 0 | 0 |
| $Ta_2O_5$ | mol. % | 0.0231 | 0.0165 | 0.014 | 0.0115 | 0.0262 | 0.0263 | 0.0263 | 0.0264 |
| Composition constraints | | | | | | | | | |
| $TiO_2$ + $Nb_2O_5$ | mol. % | 43.11 | 37.16 | 43.55 | 37.80 | 49.01 | 49.00 | 49.02 | 49.02 |
| $Alk_2O$ + RO + $Bi_2O_3$ + 3 * $Al_2O_3$ − $P_2O_5$ | mol. % | 7.893 | 13.87 | 7.465 | 13.23 | 1.283 | 1.286 | 1.265 | 1.254 |
| Measured properties | | | | | | | | | |
| $d_{RT}$ | g/cm³ | 4.209 | 4.629 | 4.092 | 4.438 | 4.124 | 4.117 | 4.123 | 4.107 |
| 15-min devit test (0/1) | | 1 | 1 | 1 | 1 | 1 | 1 | 1 | 1 |
| Predicted and calculated properties | | | | | | | | | |
| $P_n$ [for $n_d$] | | 1.9654 | 1.9677 | 1.9341 | 1.944 | 2.0086 | 2.0049 | 2.007 | 2.0033 |
| $P_d$ [for $d_{RT}$] | g/cm³ | 4.1607 | 4.4733 | 4.0218 | 4.3533 | 4.0822 | 4.0729 | 4.0837 | 4.0756 |
| $P_n$ − (1.14 + 0.192 * $P_d$) | | 0.0265 | −0.0312 | 0.0219 | −0.0318 | 0.0848 | 0.0829 | 0.0829 | 0.0808 |
| $P_n$ − (1.205 + 0.192 * $P_d$) | | −0.0385 | −0.0962 | −0.0431 | −0.0968 | 0.0198 | 0.0179 | 0.0179 | 0.0158 |
| Exemplary Glass | | 17 | 18 | 19 | 20 | 21 | 22 | 23 | 24 |
| Composition-mol. % | | | | | | | | | |
| $TiO_2$ | mol. % | 21.99 | 21.99 | 21.99 | 21.99 | 22.00 | 21.99 | 22.00 | 22.00 |
| $Nb_2O_5$ | mol. % | 27.00 | 26.99 | 26.99 | 27.00 | 27.00 | 26.99 | 27.00 | 27.00 |

TABLE 5-continued

Exemplary Glass Compositions

| | | | | | | | | | |
|---|---|---|---|---|---|---|---|---|---|
| Bi$_2$O$_3$ | mol. % | 5.00 | 5.00 | 5.00 | 5.00 | 5.00 | 5.00 | 5.00 | 5.00 |
| P$_2$O$_5$ | mol. % | 24.85 | 24.83 | 24.83 | 24.84 | 24.85 | 24.82 | 24.85 | 24.84 |
| BaO | mol. % | 7.13 | 7.12 | 7.13 | 7.13 | 7.13 | 7.13 | 7.13 | 7.12 |
| CaO | mol. % | 7.01 | 7.01 | 7.00 | 6.99 | 7.02 | 7.03 | 7.01 | 6.99 |
| K$_2$O | mol. % | 3.35 | 0 | 1.79 | 3.17 | 4.89 | 0 | 1.93 | 3.43 |
| Li$_2$O | mol. % | 3.64 | 2.06 | 1.96 | 1.96 | 2.08 | 0 | 0 | 0 |
| Na$_2$O | mol. % | 0 | 4.97 | 3.29 | 1.89 | 0 | 7.01 | 5.07 | 3.59 |
| Ta$_2$O$_5$ | mol. % | 0.0265 | 0.0264 | 0.0265 | 0.0266 | 0.0266 | 0.0265 | 0.0266 | 0.0267 |
| Composition constraints | | | | | | | | | |
| TiO$_2$ + Nb$_2$O$_5$ | mol. % | 49.00 | 48.98 | 48.98 | 48.99 | 49.00 | 48.98 | 49.01 | 49.00 |
| Alk$_2$O + RO + Bi$_2$O$_3$ + 3 * Al$_2$O$_3$ − P$_2$O$_5$ | mol. % | 1.278 | 1.329 | 1.340 | 1.300 | 1.267 | 1.350 | 1.275 | 1.291 |
| Measured properties | | | | | | | | | |
| n$_d$ | | 2.0035 | | | | | | | |
| d$_{RT}$ | g/cm$^3$ | 4.097 | 4.109 | 4.122 | 4.087 | 4.088 | 4.120 | 4.095 | 4.111 |
| n$_{632.8\ nm}$ | | 1.9924 | | | | | | | |
| n$_{531.9\ nm}$ | | 2.0226 | | | | | | | |
| n$_{F\ (486.13\ nm)}$ | | 2.0452 | | | | | | | |
| v$_d$ | | 17.5 | | | | | | | |
| (n$_d$ − 1)/d$_{RT}$ | | 0.24493 | | | | | | | |
| 15-min devit test (0/1) | | 1 | 1 | 1 | 1 | 1 | 1 | 1 | 1 |
| Predicted and calculated properties | | | | | | | | | |
| P$_n$ [for n$_d$] | | 2.0003 | 2.005 | 2.0013 | 1.9987 | 1.9956 | 2.0027 | 1.999 | 1.996 |
| P$_d$ [for d$_{RT}$] | g/cm$^3$ | 4.0671 | 4.0845 | 4.0761 | 4.0693 | 4.0612 | 4.0867 | 4.0774 | 4.0699 |
| P$_n$ − (1.14 + 0.192 * P$_d$) | | 0.0794 | 0.0808 | 0.0787 | 0.0774 | 0.0758 | 0.0780 | 0.0762 | 0.0745 |
| P$_n$ − (1.205 + 0.192 * P$_d$) | | 0.0144 | 0.0158 | 0.0137 | 0.0124 | 0.0108 | 0.0130 | 0.0112 | 0.0096 |

| Exemplary Glass | | 25 | 26 | 27 | 28 | 29 | 30 | 31 | 32 |
|---|---|---|---|---|---|---|---|---|---|
| Composition-mol. % | | | | | | | | | |
| TiO$_2$ | mol. % | 21.99 | 22.00 | 13.92 | 13.98 | 11.42 | 11.18 | 10.05 | 10.68 |
| Nb$_2$O$_5$ | mol. % | 26.99 | 27.00 | 23.43 | 23.99 | 24.31 | 23.37 | 25.96 | 25.06 |
| Bi$_2$O$_3$ | mol. % | 5.00 | 5.00 | 24.98 | 24.99 | 23.38 | 23.91 | 26.01 | 27.11 |
| P$_2$O$_5$ | mol. % | 24.84 | 24.84 | 24.98 | 24.98 | 24.66 | 24.76 | 25.14 | 25.08 |
| BaO | mol. % | 7.13 | 7.13 | 4.19 | 3.99 | 4.64 | 3.87 | 2.59 | 2.41 |
| CaO | mol. % | 7.01 | 7.01 | 4.21 | 4.01 | 2.71 | 0.96 | 0.95 | 0.68 |
| K$_2$O | mol. % | 4.95 | 7.00 | 4.20 | 4.01 | 3.84 | 4.17 | 4.56 | 4.41 |
| WO$_3$ | mol. % | 0 | 0 | 0 | 0 | 4.80 | 7.32 | 4.11 | 3.93 |
| Li$_2$O | mol. % | 0 | 0 | 0 | 0 | 0.16 | 0.41 | 0.59 | 0.60 |
| Na$_2$O | mol. % | 2.07 | 0 | 0.0384 | 0 | 0 | 0 | 0 | 0 |
| SrO | mol. % | 0 | 0 | 0.023 | 0.0231 | 0.0466 | 0.0237 | 0.0244 | 0.0246 |
| Ta$_2$O$_5$ | mol. % | 0.0267 | 0.023 | 0.0216 | 0.0217 | 0.0218 | 0.0222 | 0.0229 | 0.0231 |
| Composition constraints | | | | | | | | | |
| TiO$_2$ + Nb$_2$O$_5$ | mol. % | 48.98 | 49.00 | 37.36 | 37.97 | 35.73 | 34.55 | 36.02 | 35.74 |
| Alk$_2$O + RO + Bi$_2$O$_3$ + 3 * Al$_2$O$_3$ − P$_2$O$_5$ | mol. % | 1.320 | 1.294 | 12.65 | 12.04 | 10.12 | 8.586 | 9.580 | 10.14 |
| Measured properties | | | | | | | | | |
| n$_d$ | | | | 2.0801 | | 2.0848 | | | |
| d$_{RT}$ | g/cm$^3$ | 4.065 | 4.060 | 5.269 | 5.272 | 5.292 | | 5.354 | |
| n$_{632.8\ nm}$ | | | | 2.0681 | | 2.0726 | | | |
| n$_{531.9\ nm}$ | | | | 2.1006 | | 2.1056 | | | |
| n$_{F\ (486.13\ nm)}$ | | | | 2.1250 | | | | | |
| T$_g$ | ° C. | | | | 568 | | | | |
| T$_x$ | ° C. | | | | 702 | | | | |
| T$_{liq}$ | ° C. | | | | | | 993 | | |
| v$_d$ | | | | 17.4 | | | | | |
| (n$_d$ − 1)/d$_{RT}$ | | | | 0.20499 | | 0.20499 | | | |
| 15-min devit test (0/1) | | 1 | 1 | 1 | 1 | 1 | 1 | 1 | 1 |
| Predicted and calculated properties | | | | | | | | | |
| P$_n$ [for n$_d$] | | 1.9929 | 1.9889 | 2.1052 | 2.1108 | 2.1112 | 2.1155 | 2.1326 | 2.1371 |
| P$_d$ [for d$_{RT}$] | g/cm$^3$ | 4.0626 | 4.0526 | 5.3155 | 5.3226 | 5.4035 | 5.4875 | 5.5175 | 5.5713 |
| P$_n$ − (1.14 + 0.192 * P$_d$) | | 0.0729 | 0.0709 | −0.0553 | −0.0512 | −0.0663 | −0.0781 | −0.0668 | −0.0726 |
| P$_n$ − (1.205 + 0.192 * P$_d$) | | 0.0079 | 0.0059 | −0.1203 | −0.1162 | −0.1313 | −0.1431 | −0.1318 | −0.1376 |

| Exemplary Glass | | 33 | 34 | 35 | 36 | 37 | 38 | 39 | 40 |
|---|---|---|---|---|---|---|---|---|---|
| Composition-mol. % | | | | | | | | | |
| TiO$_2$ | mol. % | 7.20 | 25.58 | 32.49 | 37.58 | 25.57 | 25.56 | 32.49 | 32.51 |
| Nb$_2$O$_5$ | mol. % | 28.82 | 31.96 | 27.07 | 23.48 | 31.96 | 31.95 | 27.08 | 27.08 |
| Bi$_2$O$_3$ | mol. % | 26.01 | 4.99 | 4.99 | 5.00 | 7.49 | 9.98 | 7.49 | 9.99 |

TABLE 5-continued

Exemplary Glass Compositions

| | | | | | | | | | |
|---|---|---|---|---|---|---|---|---|---|
| $P_2O_5$ | mol. % | 25.09 | 24.97 | 24.97 | 24.98 | 24.98 | 24.97 | 24.98 | 24.97 |
| BaO | mol. % | 2.56 | 6.20 | 5.18 | 4.44 | 4.95 | 3.70 | 3.94 | 2.69 |
| CaO | mol. % | 0.97 | 0 | 0 | 0 | 0 | 0 | 0 | 0 |
| $K_2O$ | mol. % | 4.54 | 4.20 | 3.18 | 2.45 | 2.96 | 1.70 | 1.94 | 0.69 |
| $WO_3$ | mol. % | 4.08 | 0 | 0 | 0 | 0 | 0 | 0 | 0 |
| $Li_2O$ | mol. % | 0.69 | 2.03 | 2.03 | 1.99 | 2.00 | 2.03 | 2.01 | 1.99 |
| SrO | mol. % | 0.0249 | 0 | 0 | 0 | 0 | 0 | 0 | 0 |
| $Al_2O_3$ | mol. % | 0 | 0.035 | 0.0495 | 0.0474 | 0.055 | 0.0575 | 0.0521 | 0.0546 |
| $SiO_2$ | mol. % | 0 | 0 | 0 | 0 | 0 | 0.0325 | 0 | 0 |
| $Ta_2O_5$ | mol. % | 0.0292 | 0.0283 | 0.0267 | 0.0219 | 0.0296 | 0.031 | 0.024 | 0.0252 |
| Composition constraints | | | | | | | | | |
| $TiO_2 + Nb_2O_5$ | mol. % | 36.01 | 57.54 | 59.57 | 61.07 | 57.54 | 57.51 | 59.57 | 59.59 |
| $Alk_2O + RO + Bi_2O_3 + 3 * Al_2O_3 - P_2O_5$ | mol. % | 9.697 | −7.445 | −9.443 | −10.96 | −7.413 | −7.389 | −9.449 | −9.456 |
| Measured properties | | | | | | | | | |
| $n_d$ | | | 2.040 | 2.038 | 2.036 | 2.061 | 2.079 | 2.059 | 2.078 |
| $d_{RT}$ | g/cm³ | 5.355 | 4.104 | 4.056 | 4.011 | 4.277 | 4.433 | 4.228 | 4.392 |
| $T_g$ | ° C. | | 639 | 634 | 629 | 626 | 614 | 621 | 612 |
| $T_x$ | ° C. | | 761 | 782 | 778 | 747 | 739 | 782 | 772 |
| $(n_d - 1)/d_{RT}$ | | | 0.25341 | 0.25592 | 0.25829 | 0.24807 | 0.24340 | 0.25047 | 0.24545 |
| 15-min devit test (0/1) | | 1 | | | | | | | |
| Predicted and calculated properties | | | | | | | | | |
| $P_n$ [for $n_d$] | | 2.1439 | 2.0509 | 2.0436 | 2.0383 | 2.0766 | 2.102 | 2.0694 | 2.0952 |
| $P_d$ [for $d_{RT}$] | g/cm³ | 5.5585 | 4.1224 | 4.0415 | 3.9825 | 4.2794 | 4.4353 | 4.1984 | 4.356 |
| $P_n - (1.14 + 0.192 * P_d)$ | | −0.0633 | 0.1194 | 0.1276 | 0.1337 | 0.1149 | 0.1105 | 0.1233 | 0.1189 |
| $P_n - (1.205 + 0.192 * P_d)$ | | −0.1283 | 0.0544 | 0.0626 | 0.0687 | 0.0499 | 0.0455 | 0.0583 | 0.0539 |

| Exemplary Glass | | 41 | 42 | 43 | 44 | 45 | 46 | 47 | 48 |
|---|---|---|---|---|---|---|---|---|---|
| Composition-mol. % | | | | | | | | | |
| $TiO_2$ | mol. % | 37.58 | 37.57 | 21.12 | 21.11 | 21.10 | 34.32 | 38.72 | 25.76 |
| $Nb_2O_5$ | mol. % | 23.48 | 23.47 | 35.18 | 35.16 | 35.19 | 28.61 | 24.19 | 32.18 |
| $Bi_2O_3$ | mol. % | 7.49 | 9.99 | 5.00 | 7.49 | 8.50 | 9.99 | 9.98 | 14.98 |
| $P_2O_5$ | mol. % | 24.98 | 24.97 | 24.99 | 24.97 | 24.99 | 24.97 | 24.96 | 24.96 |
| BaO | mol. % | 3.20 | 1.95 | 6.84 | 5.59 | 5.09 | 0 | 0 | 0 |
| $K_2O$ | mol. % | 1.21 | 0 | 4.83 | 3.59 | 3.09 | 0 | 0 | 0 |
| $Li_2O$ | mol. % | 1.99 | 1.97 | 1.98 | 2.01 | 1.98 | 1.99 | 2.03 | 1.99 |
| $Al_2O_3$ | mol. % | 0.0499 | 0.0699 | 0.0363 | 0.0379 | 0.0386 | 0.0731 | 0.0698 | 0.0624 |
| $SiO_2$ | mol. % | 0 | 0 | 0 | 0 | 0 | 0.031 | 0.0296 | 0.0353 |
| $Ta_2O_5$ | mol. % | 0.023 | 0.0202 | 0.0335 | 0.0306 | 0.0312 | 0.0253 | 0.0242 | 0.0288 |
| Composition constraints | | | | | | | | | |
| $TiO_2 + Nb_2O_5$ | mol. % | 61.06 | 61.04 | 56.29 | 56.28 | 56.29 | 62.92 | 62.91 | 57.94 |
| $Alk_2O + RO + Bi_2O_3 + 3 * Al_2O_3 - P_2O_5$ | mol. % | −10.95 | −10.85 | −6.235 | −6.182 | −6.219 | −12.77 | −12.74 | −7.806 |
| Measured properties | | | | | | | | | |
| $n_d$ | | 2.059 | 2.078 | 2.043 | | | 2.096 | 2.088 | 2.123 |
| $d_{RT}$ | g/cm³ | 4.188 | 4.366 | 4.146 | 4.304 | 4.331 | 4.359 | 4.330 | 4.716 |
| $T_g$ | ° C. | 617 | 608 | 642 | 630 | 626 | 609 | 605 | 596 |
| $T_x$ | ° C. | 768 | 750 | 751 | 738 | 735 | 749 | 742 | 712 |
| $(n_d - 1)/d_{RT}$ | | 0.25287 | 0.24691 | 0.25157 | | | 0.25143 | 0.25127 | 0.23813 |
| Predicted and calculated properties | | | | | | | | | |
| $P_n$ [for $n_d$] | | 2.064 | 2.0894 | 2.0562 | 2.0818 | 2.0922 | 2.1171 | 2.0996 | 2.1531 |
| $P_d$ [for $d_{RT}$] | g/cm³ | 4.1393 | 4.2955 | 4.1759 | 4.3322 | 4.3955 | 4.3304 | 4.2655 | 4.7193 |
| $P_n - (1.14 + 0.192 * P_d)$ | | 0.1292 | 0.1247 | 0.1144 | 0.1100 | 0.1082 | 0.1456 | 0.1406 | 0.1070 |
| $P_n - (1.205 + 0.192 * P_d)$ | | 0.0642 | 0.0597 | 0.0494 | 0.0450 | 0.0432 | 0.0806 | 0.0756 | 0.0420 |

| Exemplary Glass | | 49 | 50 | 51 | 52 | 53 | 54 | 55 | 56 |
|---|---|---|---|---|---|---|---|---|---|
| Composition-mol. % | | | | | | | | | |
| $TiO_2$ | mol. % | 21.99 | 13.51 | 31.59 | 35.65 | 30.23 | 34.11 | 23.55 | 28.88 |
| $Nb_2O_5$ | mol. % | 26.99 | 18.80 | 26.32 | 22.28 | 25.19 | 21.32 | 29.43 | 24.05 |
| $Bi_2O_3$ | mol. % | 5.00 | 24.96 | 14.98 | 14.98 | 17.47 | 17.47 | 19.99 | 19.96 |
| $P_2O_5$ | mol. % | 24.85 | 24.96 | 24.97 | 24.96 | 24.97 | 24.96 | 24.99 | 24.96 |
| BaO | mol. % | 7.13 | 5.88 | 0 | 0 | 0 | 0 | 0 | 0 |
| CaO | mol. % | 7.00 | 5.88 | 0 | 0 | 0 | 0 | 0 | 0 |
| $K_2O$ | mol. % | 0 | 5.87 | 0 | 0 | 0 | 0 | 0 | 0 |
| $Li_2O$ | mol. % | 7.01 | 0 | 2.02 | 2.01 | 2.03 | 2.02 | 1.97 | 2.03 |
| $Na_2O$ | mol. % | 0 | 0.0744 | 0 | 0 | 0 | 0 | 0 | 0 |
| SrO | mol. % | 0 | 0.0445 | 0 | 0 | 0 | 0 | 0 | 0 |
| $Al_2O_3$ | mol. % | 0 | 0 | 0.0592 | 0.057 | 0.0614 | 0.0593 | 0.0444 | 0.0636 |

TABLE 5-continued

Exemplary Glass Compositions

| | | | | | | | | | |
|---|---|---|---|---|---|---|---|---|---|
| SiO$_2$ | mol. % | 0 | 0 | 0.0335 | 0.0322 | 0.0347 | 0.0335 | 0 | 0.036 |
| Ta$_2$O$_5$ | mol. % | 0.0261 | 0.0157 | 0.0228 | 0.0219 | 0.0236 | 0.0182 | 0.0256 | 0.0245 |

Composition constraints

| | | | | | | | | | |
|---|---|---|---|---|---|---|---|---|---|
| TiO$_2$ + Nb$_2$O$_5$ | mol. % | 48.99 | 32.31 | 57.92 | 57.93 | 55.42 | 55.43 | 52.98 | 52.93 |
| Alk$_2$O + RO + Bi$_2$O$_3$ + 3 * Al$_2$O$_3$ – P$_2$O$_5$ | mol. % | 1.297 | 17.75 | –7.791 | –7.802 | –5.284 | –5.285 | –2.901 | –2.782 |

Measured properties

| | | | | | | | | | |
|---|---|---|---|---|---|---|---|---|---|
| n$_d$ | | | | 2.109 | 2.101 | 2.114 | 2.106 | 2.133 | 2.123 |
| d$_{RT}$ | g/cm$^3$ | | | 4.699 | 4.685 | 4.842 | 4.822 | 5.020 | 5.010 |
| T$_g$ | ° C. | | | 594 | 589 | 581 | 582 | 581 | 577 |
| T$_x$ | ° C. | | | 740 | 731 | 729 | 721 | 721 | 718 |
| (n$_d$ – 1)/d$_{RT}$ | | | | 0.23601 | 0.23501 | 0.23007 | 0.22937 | 0.22570 | 0.22415 |

Predicted and calculated properties

| | | | | | | | | | |
|---|---|---|---|---|---|---|---|---|---|
| P$_n$ [for n$_d$] | | 2.0107 | 2.0602 | 2.1297 | 2.1139 | 2.1361 | 2.1209 | 2.1642 | 2.1424 |
| P$_d$ [for d$_{RT}$] | g/cm$^3$ | 4.0799 | 5.2612 | 4.6328 | 4.5739 | 4.784 | 4.7274 | 5.0161 | 4.9352 |
| P$_n$ – (1.14 + 0.192 * P$_d$) | | 0.0874 | –0.0900 | 0.1002 | 0.0957 | 0.0775 | 0.0732 | 0.0611 | 0.0549 |
| P$_n$ – (1.205 + 0.192 * P$_d$) | | 0.0224 | –0.1550 | 0.0352 | 0.0307 | 0.0125 | 0.0082 | –0.0039 | –0.0101 |

| Exemplary Glass | | 57 | 58 | 59 | 60 | 61 | 62 | 63 | 64 |
|---|---|---|---|---|---|---|---|---|---|

Composition-mol. %

| | | | | | | | | | |
|---|---|---|---|---|---|---|---|---|---|
| TiO$_2$ | mol. % | 32.58 | 23.65 | 19.97 | 12.98 | 19.81 | 12.83 | 10.96 | 20.01 |
| Nb$_2$O$_5$ | mol. % | 20.35 | 7.36 | 10.44 | 12.98 | 13.61 | 23.14 | 24.56 | 18.83 |
| Bi$_2$O$_3$ | mol. % | 19.97 | 18.94 | 19.53 | 24.97 | 24.97 | 24.97 | 27.92 | 24.99 |
| P$_2$O$_5$ | mol. % | 24.95 | 24.47 | 24.47 | 24.96 | 24.97 | 24.97 | 25.04 | 24.97 |
| BaO | mol. % | 0 | 8.99 | 8.99 | 7.99 | 5.51 | 3.44 | 2.29 | 3.71 |
| CaO | mol. % | 0 | 8.99 | 8.99 | 8.00 | 5.51 | 1.74 | 0.50 | 3.72 |
| K$_2$O | mol. % | 0 | 7.50 | 7.49 | 7.98 | 5.51 | 4.27 | 4.28 | 3.70 |
| WO$_3$ | mol. % | 0 | 0 | 0 | 0 | 0 | 4.27 | 3.80 | 0 |
| Li$_2$O | mol. % | 2.03 | 0 | 0 | 0 | 0 | 0.33 | 0.60 | 0 |
| Na$_2$O | mol. % | 0 | 0.0605 | 0.0631 | 0.0713 | 0.0712 | 0 | 0 | 0.037 |
| SrO | mol. % | 0 | 0.0362 | 0.0377 | 0.064 | 0.0426 | 0.0235 | 0.0248 | 0.0221 |
| Al$_2$O$_3$ | mol. % | 0.0616 | 0 | 0 | 0 | 0 | 0 | 0 | 0 |
| SiO$_2$ | mol. % | 0.0348 | 0 | 0 | 0 | 0 | 0 | 0 | 0 |
| Ta$_2$O$_5$ | mol. % | 0.019 | 0.0085 | 0.0088 | 0.01 | 0.015 | 0.0221 | 0.0232 | 0.0156 |

Composition constraints

| | | | | | | | | | |
|---|---|---|---|---|---|---|---|---|---|
| TiO$_2$ + Nb$_2$O$_5$ | mol. % | 52.93 | 31.01 | 30.41 | 25.96 | 33.41 | 35.96 | 35.52 | 38.84 |
| Alk$_2$O + RO + Bi$_2$O$_3$ + 3 * Al$_2$O$_3$ – P$_2$O$_5$ | mol. % | –2.767 | 20.05 | 20.64 | 24.11 | 16.64 | 9.801 | 10.58 | 11.20 |

Measured properties

| | | | | | | | | | |
|---|---|---|---|---|---|---|---|---|---|
| n$_d$ | | 2.113 | | | | | | | |
| d$_{RT}$ | g/cm$^3$ | 5.004 | | | | | | | 5.269 |
| T$_g$ | ° C. | 572 | | | | | | 553 | |
| T$_x$ | ° C. | 702 | | | | | | 658 | |
| T$_{liq}$ | ° C. | | | | | | | 986 | |
| (n$_d$ – 1)/d$_{RT}$ | | 0.22242 | | | | | | | |
| 15-min devit test (0/1) | | | | | | | 1 | | 1 |

Predicted and calculated properties

| | | | | | | | | | |
|---|---|---|---|---|---|---|---|---|---|
| P$_n$ [for n$_d$] | | 2.1279 | 1.9555 | 1.9703 | 2.0037 | 2.0455 | 2.1153 | 2.1412 | 2.095 |
| P$_d$ [for d$_{RT}$] | g/cm$^3$ | 4.8814 | 4.7425 | 4.8276 | 5.194 | 5.1824 | 5.4378 | 5.6147 | 5.2446 |
| P$_n$ – (1.14 + 0.192 * P$_d$) | | 0.0507 | –0.0951 | –0.0966 | –0.1335 | –0.0895 | –0.0687 | –0.0768 | –0.0520 |
| P$_n$ – (1.205 + 0.192 * P$_d$) | | –0.0143 | –0.1601 | –0.1616 | –0.1985 | –0.1545 | –0.1337 | –0.1418 | –0.1170 |

| Exemplary Glass | | 65 | 66 | 67 | 68 | 69 | 70 | 71 | 72 |
|---|---|---|---|---|---|---|---|---|---|

Composition-mol. %

| | | | | | | | | | |
|---|---|---|---|---|---|---|---|---|---|
| TiO$_2$ | mol. % | 24.65 | 14.38 | 20.53 | 24.66 | 29.24 | 15.27 | 16.15 | 13.70 |
| Nb$_2$O$_5$ | mol. % | 14.05 | 28.25 | 22.98 | 19.13 | 14.47 | 22.72 | 21.85 | 22.31 |
| Bi$_2$O$_3$ | mol. % | 25.00 | 24.98 | 24.98 | 24.99 | 24.99 | 26.58 | 27.67 | 26.03 |
| P$_2$O$_5$ | mol. % | 24.99 | 24.97 | 24.97 | 24.98 | 24.99 | 25.31 | 25.54 | 25.18 |
| BaO | mol. % | 3.75 | 2.44 | 2.16 | 2.06 | 2.08 | 2.72 | 1.85 | 2.62 |
| CaO | mol. % | 3.74 | 2.46 | 2.15 | 2.04 | 2.08 | 2.72 | 1.83 | 0.97 |
| K$_2$O | mol. % | 3.75 | 2.43 | 2.15 | 2.07 | 2.08 | 4.48 | 4.81 | 4.60 |
| WO$_3$ | mol. % | 0 | 0 | 0 | 0 | 0 | 0 | 0 | 4.15 |
| Li$_2$O | mol. % | 0 | 0 | 0 | 0 | 0 | 0.16 | 0.25 | 0.41 |
| Na$_2$O | mol. % | 0.0356 | 0.0397 | 0.0381 | 0.0369 | 0.0355 | 0 | 0 | 0 |
| SrO | mol. % | 0.0213 | 0.0237 | 0.0228 | 0.0221 | 0.0213 | 0.0234 | 0.0236 | 0.0237 |
| Ta$_2$O$_5$ | mol. % | 0.015 | 0.0278 | 0.0214 | 0.0155 | 0.015 | 0.0219 | 0.0222 | 0.0223 |

TABLE 5-continued

| Exemplary Glass Compositions | | | | | | | | | |
|---|---|---|---|---|---|---|---|---|---|
| Composition constraints | | | | | | | | | |
| $TiO_2 + Nb_2O_5$ | mol. % | 38.70 | 42.64 | 43.52 | 43.79 | 43.71 | 37.98 | 38.00 | 36.01 |
| $Alk_2O + RO + Bi_2O_3 + 3 * Al_2O_3 - P_2O_5$ | mol. % | 11.29 | 7.391 | 6.523 | 6.227 | 6.302 | 11.37 | 10.90 | 9.457 |
| Measured properties | | | | | | | | | |
| $d_{RT}$ | g/cm³ | 5.278 | 5.266 | 5.271 | 5.278 | | 5.365 | 5.365 | 5.376 |
| $T_g$ | °C. | | | | | | | | 555 |
| $T_x$ | °C. | | | | | | | | 681 |
| $T_{liq}$ | °C. | | | | | | 1004 | | 973 |
| 15-min devit test (0/1) | | | | | | | 1 | 1 | 1 |
| Predicted and calculated properties | | | | | | | | | |
| $P_n$ [for $n_d$] | | 2.0753 | 2.1522 | 2.136 | 2.1222 | 2.1034 | 2.1155 | 2.1189 | 2.1182 |
| $P_d$ [for $d_{RT}$] | g/cm³ | 5.1751 | 5.3717 | 5.2918 | 5.2346 | 5.1666 | 5.3714 | 5.4057 | 5.4669 |
| $P_n - (1.14 + 0.192 * P_d)$ | | −0.0583 | −0.0191 | −0.0200 | −0.0228 | −0.0286 | −0.0558 | −0.0590 | −0.0714 |
| $P_n - (1.205 + 0.192 * P_d)$ | | −0.1233 | −0.0841 | −0.0850 | −0.0878 | −0.0936 | −0.1208 | −0.1240 | −0.1364 |

| Exemplary Glass | | 73 | 74 | 75 | 76 | 77 | 78 |
|---|---|---|---|---|---|---|---|
| Composition-mol. % | | | | | | | |
| $TiO_2$ | mol. % | 13.70 | 14.08 | 20.82 | 7.36 | 9.94 | 13.37 |
| $Nb_2O_5$ | mol. % | 22.31 | 21.66 | 34.44 | 29.27 | 28.28 | 27.01 |
| $Bi_2O_3$ | mol. % | 26.03 | 27.19 | 8.32 | 4.81 | 4.89 | 5.00 |
| $P_2O_5$ | mol. % | 25.18 | 25.14 | 24.31 | 17.89 | 19.40 | 21.41 |
| BaO | mol. % | 2.62 | 2.44 | 5.05 | 19.07 | 19.61 | 20.34 |
| CaO | mol. % | 0.97 | 0.67 | 0.24 | 0 | 0 | 0 |
| $K_2O$ | mol. % | 4.60 | 4.41 | 3.19 | 4.67 | 3.41 | 1.74 |
| $WO_3$ | mol. % | 4.15 | 3.96 | 0 | 0 | 0 | 0 |
| $Li_2O$ | mol. % | 0.41 | 0.42 | 3.56 | 0 | 0 | 0 |
| $Na_2O$ | mol. % | 0 | 0 | 0 | 5.92 | 5.64 | 5.21 |
| $B_2O_3$ | mol. % | 0 | 0 | 0 | 6.55 | 6.27 | 5.83 |
| $GeO_2$ | mol. % | 0 | 0 | 0 | 4.33 | 2.46 | 0 |
| SrO | mol. % | 0.0237 | 0.024 | 0 | 0.10 | 0.0856 | 0.0681 |
| $Al_2O_3$ | mol. % | 0 | 0 | 0.038 | 0 | 0 | 0 |
| $Ta_2O_5$ | mol. % | 0.0223 | 0.0225 | 0.0307 | 0.0282 | 0.0281 | 0.024 |
| Composition constraints | | | | | | | |
| $TiO_2 + Nb_2O_5$ | mol. % | 36.01 | 35.74 | 55.26 | 36.63 | 38.22 | 40.38 |
| $Alk_2O + RO + Bi_2O_3 + 3 * Al_2O_3 - P_2O_5$ | mol. % | 9.457 | 10.00 | −3.845 | 16.68 | 14.23 | 10.95 |
| $GeO_2 + TeO_2$ | mol. % | 0 | 0 | 0 | 4.325 | 2.458 | 0 |
| Measured properties | | | | | | | |
| $n_d$ | | 2.0932 | | | | | |
| $d_{RT}$ | g/cm³ | 5.370 | 5.438 | | | | |
| $n_{632.8\ nm}$ | | 2.0808 | | | | | |
| $n_{531.9\ nm}$ | | 2.1143 | | | | | |
| $(n_d - 1)/d_{RT}$ | | 0.20358 | | | | | |
| 15-min devit test (0/1) | | 1 | 1 | 1 | | | |
| 2.5-min devit test (0/1) | | | | | 1 | 1 | 1 |
| Predicted and calculated properties | | | | | | | |
| $P_n$ [for $n_d$] | | 2.1182 | 2.1243 | 2.085 | 1.9494 | 1.9543 | 1.9614 |
| $P_d$ [for $d_{RT}$] | g/cm³ | 5.4669 | 5.5284 | 4.3739 | 4.3732 | 4.3603 | 4.3453 |
| $P_n - (1.14 + 0.192 * P_d)$ | | −0.0714 | −0.0772 | 0.1052 | −0.0302 | −0.0229 | −0.0129 |
| $P_n - (1.205 + 0.192 * P_d)$ | | −0.1364 | −0.1422 | 0.0402 | −0.0952 | −0.0879 | −0.0779 |

Table 6 below lists the glass compositions and properties for Comparative Glasses C1-C12.

TABLE 6

| Compositions and Properties of Comparative Example Glasses | | | | | |
|---|---|---|---|---|---|
| Comparative Examples | | C1 | C2 | C3 | C4 |
| Reference | | [2] | [3] | [1] | [6] |
| Composition-mol. % | | | | | |
| $P_2O_5$ | mol. % | 31.11 | 25.50 | 25.50 | 23.51 |
| $Bi_2O_3$ | mol. % | 5.49 | 23.99 | 23.99 | 17.11 |
| ZnO | mol. % | 14.28 | 0 | 0 | 0 |

TABLE 6-continued

Compositions and Properties of Comparative Example Glasses

|  | | | | | |
|---|---|---|---|---|---|
| Na$_2$O | mol. % | 15.00 | 10.51 | 10.51 | 2.77 |
| Al$_2$O$_3$ | mol. % | 7.98 | 0 | 0 | 0 |
| K$_2$O | mol. % | 7.40 | 1.99 | 1.99 | 0 |
| Li$_2$O | mol. % | 15.55 | 2.02 | 2.02 | 2.60 |
| Nb$_2$O$_5$ | mol. % | 1.75 | 17.99 | 17.99 | 18.72 |
| TiO$_2$ | mol. % | 1.46 | 7.00 | 7.00 | 21.38 |
| WO$_3$ | mol. % | 0 | 8.00 | 8.00 | 7.49 |
| BaO | mol. % | 0 | 1.00 | 1.00 | 0 |
| B$_2$O$_3$ | mol. % | 0 | 2.00 | 2.00 | 6.43 |
| SiO$_2$ | mol. % | 0 | 0 | 0 | 0 |
| Measured properties | | | | | |
| n$_d$ | | 1.6332 | 2.0339 | | 2.0702 |
| d$_{RT}$ | g/cm$^3$ | | 5.320 | | 4.990 |
| n$_{632.8\,nm}$ | | 1.6299 | 2.0230 | | 2.0582 |
| n$_{531.9\,nm}$ | | 1.6385 | 2.0525 | | 2.0907 |
| n$_{F\,(486.13\,nm)}$ | | 1.6444 | 2.0743 | | 2.1149 |
| T$_g$ | ° C. | 350.40 | 497.00 | | 540.20 |
| T$_{liq}$ | ° C. | | 930.00 | | 1010.0 |
| v$_d$ | | 39.9 | 18.5 | | 17.3 |
| (n$_d$ − 1)/d$_{RT}$ | | | 0.19434 | | 0.21447 |
| Predicted and calculated properties | | | | | |
| P$_n$ [for n$_d$] | | 1.619 | 2.036 | 2.036 | 2.057 |
| P$_d$ [for d$_{RT}$] | g/cm$^3$ | 3.167 | 5.274 | 5.274 | 4.834 |

| Comparative Examples | C5 | C6 | C7 | C8 |
|---|---|---|---|---|
| Reference | [7] | [4] | [5] | [8] |

|  | | | | | |
|---|---|---|---|---|---|
| Composition-mol. % | | | | | |
| P$_2$O$_5$ | mol. % | 23.51 | 25.42 | 22.98 | 25.71 |
| Bi$_2$O$_3$ | mol. % | 17.11 | 23.93 | 21.49 | 20.56 |
| ZnO | mol. % | 0 | 0 | 0 | 0 |
| Na$_2$O | mol. % | 2.77 | 10.45 | 6.81 | 7.37 |
| Al$_2$O$_3$ | mol. % | 0 | 0 | 0 | 0 |
| K$_2$O | mol. % | 0 | 1.97 | 2.10 | 1.74 |
| Li$_2$O | mol. % | 2.60 | 2.32 | 8.23 | 7.79 |
| Nb$_2$O$_5$ | mol. % | 18.72 | 17.93 | 17.29 | 17.90 |
| TiO$_2$ | mol. % | 21.38 | 6.95 | 7.08 | 7.39 |
| WO$_3$ | mol. % | 7.49 | 7.98 | 8.30 | 7.37 |
| BaO | mol. % | 0 | 1.06 | 1.80 | 1.48 |
| B$_2$O$_3$ | mol. % | 6.43 | 1.99 | 3.00 | 2.69 |
| SiO$_2$ | mol. % | 0 | 0 | 0.91 | 0 |
| Measured properties | | | | | |
| n$_d$ | | 2.0702 | 2.0339 | 2.000 | |
| d$_{RT}$ | g/cm$^3$ | 4.990 | | 5.100 | 5.100 |
| n$_{632.8\,nm}$ | | 2.0582 | 2.0230 | 1.9897 | |
| n$_{531.9\,nm}$ | | 2.0907 | 2.0525 | 2.0175 | |
| n$_{F\,(486.13\,nm)}$ | | 2.1149 | 2.0743 | 2.0380 | |
| T$_g$ | ° C. | 540.20 | | 483.00 | 479.00 |
| T$_{liq}$ | ° C. | 1010.0 | | | |
| v$_d$ | | 17.3 | 18.5 | 19.0 | |
| (n$_d$ − 1)/d$_{RT}$ | | 0.21447 | | 0.19608 | |
| Predicted and calculated properties | | | | | |
| P$_n$ [for n$_d$] | | 2.057 | 2.035 | 2.018 | 2.005 |
| P$_d$ [for d$_{RT}$] | g/cm$^3$ | 4.834 | 5.270 | 5.128 | 4.995 |

| Comparative Examples | C9 | C10 | C11 | C12 |
|---|---|---|---|---|
| Reference | [10] | [9] | [11] | [12] |

|  | | | | | |
|---|---|---|---|---|---|
| Composition-mol. % | | | | | |
| P$_2$O$_5$ | mol. % | 24.00 | 25.69 | 25.32 | 24.00 |
| Bi$_2$O$_3$ | mol. % | 5.00 | 20.57 | 4.70 | 8.00 |
| Na$_2$O | mol. % | 14.99 | 7.38 | 0 | 11.00 |
| K$_2$O | mol. % | 2.00 | 1.74 | 1.91 | 1.99 |
| Li$_2$O | mol. % | 20.02 | 7.80 | 16.38 | 17.99 |
| Nb$_2$O$_5$ | mol. % | 18.00 | 17.91 | 23.27 | 19.00 |
| TiO$_2$ | mol. % | 5.00 | 7.34 | 0.71 | 6.01 |
| WO$_3$ | mol. % | 5.00 | 7.32 | 10.78 | 6.00 |
| BaO | mol. % | 2.00 | 1.48 | 4.60 | 2.00 |
| B$_2$O$_3$ | mol. % | 4.01 | 2.70 | 0 | 4.01 |
| Sb$_2$O$_3$ | mol. % | 0 | 0.0814 | 0.0604 | 0 |

TABLE 6-continued

| Compositions and Properties of Comparative Example Glasses | | | | | |
|---|---|---|---|---|---|
| GeO$_2$ | mol. % | 0 | 0 | 10.00 | 0 |
| Cs$_2$O | mol. % | 0 | 0 | 2.26 | 0 |
| MoO$_3$ | mol. % | 0 | 0 | 0.0122 | 0 |
| Measured properties | | | | | |
| n$_d$ | | 1.8442 | 2.000 | 1.9055 | 1.9002 |
| d$_{RT}$ | g/cm$^3$ | 3.885 | 5.100 | 4.271 | 4.194 |
| n$_{632.8\,nm}$ | | 1.8370 | | 1.8971 | 1.8919 |
| n$_{531.9\,nm}$ | | 1.8563 | | 1.9194 | 1.9141 |
| n$_{F\,(486.13)}$ | | 1.8702 | | 1.9357 | 1.9302 |
| T$_g$ | ° C. | 449.00 | 479.00 | 521.00 | 461.00 |
| T$_{liq}$ | ° C. | 910.00 | | | 900.00 |
| v$_d$ | | 23.3 | | 21.7 | 21.5 |
| (n$_d$ − 1)/d$_{RT}$ | | 0.21730 | 0.19608 | 0.21200 | 0.21463 |
| Predicted and calculated properties | | | | | |
| P$_n$ [for n$_d$] | | 1.834 | 2.005 | 1.911 | 1.884 |
| P$_d$ [for d$_{RT}$] | g/cm$^3$ | 3.752 | 4.995 | 4.264 | 4.045 |

The reference key for each of the Comparative Glasses listed in Table 6 is as follows: [1] CN113024107A; [2] JP2004123448A; [3] JP2006111499A; [4] JP2010083701; [5] US2021179479; [6] US8647994B2; [7] US8716157B2; [8] WO2019151404A1; [9] US2021048665; [10] US7309670B2; [11] US7553785B2; [12] US7994082B2.

Figure 4:
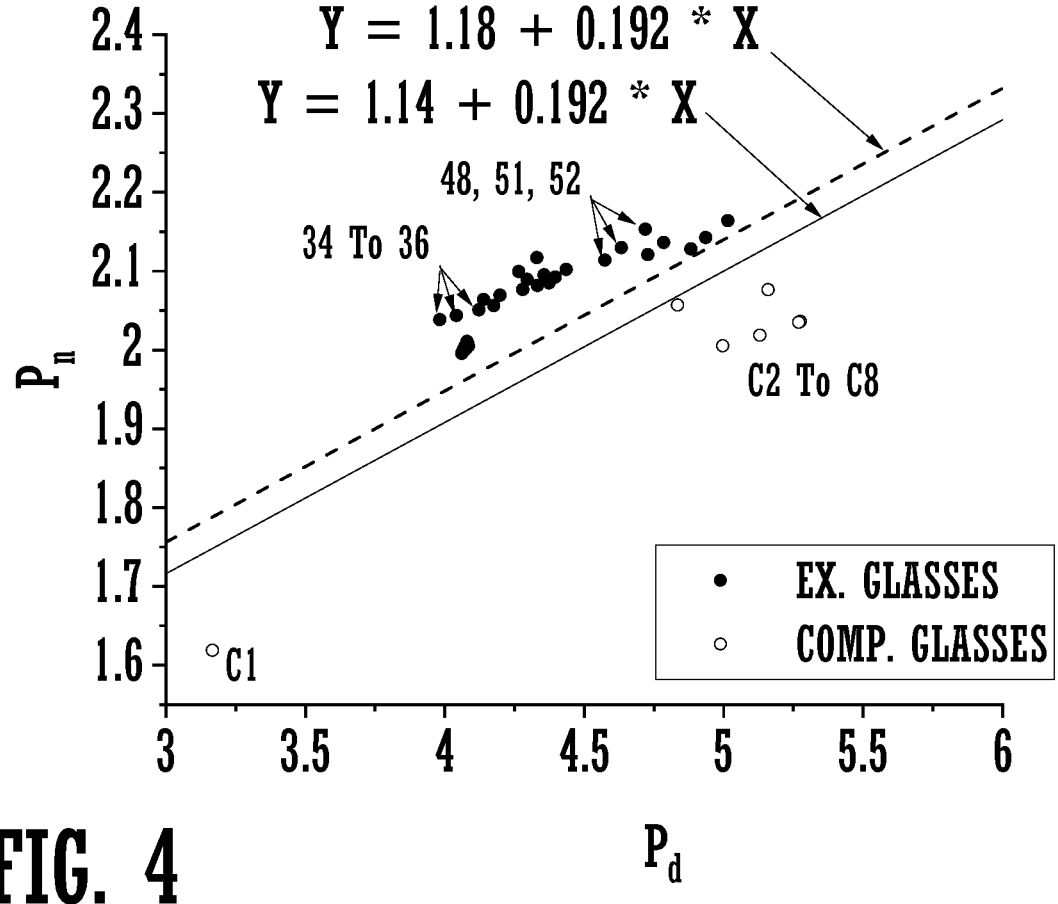
FIG. 4 is a plot illustrating the relationship between the density parameter $P_d$ and the refractive index parameter $P_n$ for some Comparative Glasses and some Exemplary Glasses according to an embodiment of the present disclosure.

FIG. 4 is a plot showing the relationship between the density parameter P$_d$ and the refractive index parameter P$_n$ for some of the Exemplary Glasses and some of the Comparative Glasses. The Exemplary Glasses (filled circles) are the Examples 13 to 21, 34 to 49, 51 to 57 and 75 from Table 5. The Comparative Glasses (open circles) are the Examples C1 to C8 from Table 6. The refractive index parameter P$_n$ that predicts refractive index at 587.56 nm n$_d$ was determined according to Formula (I). The density parameter P$_d$ that predicts density at room temperature d$_{RT}$ was determined according to Formula (II). All of the Exemplary Glasses and Comparative Glasses shown in FIG. 4 have the features specified in Table 7.

TABLE 7

Figure 5:
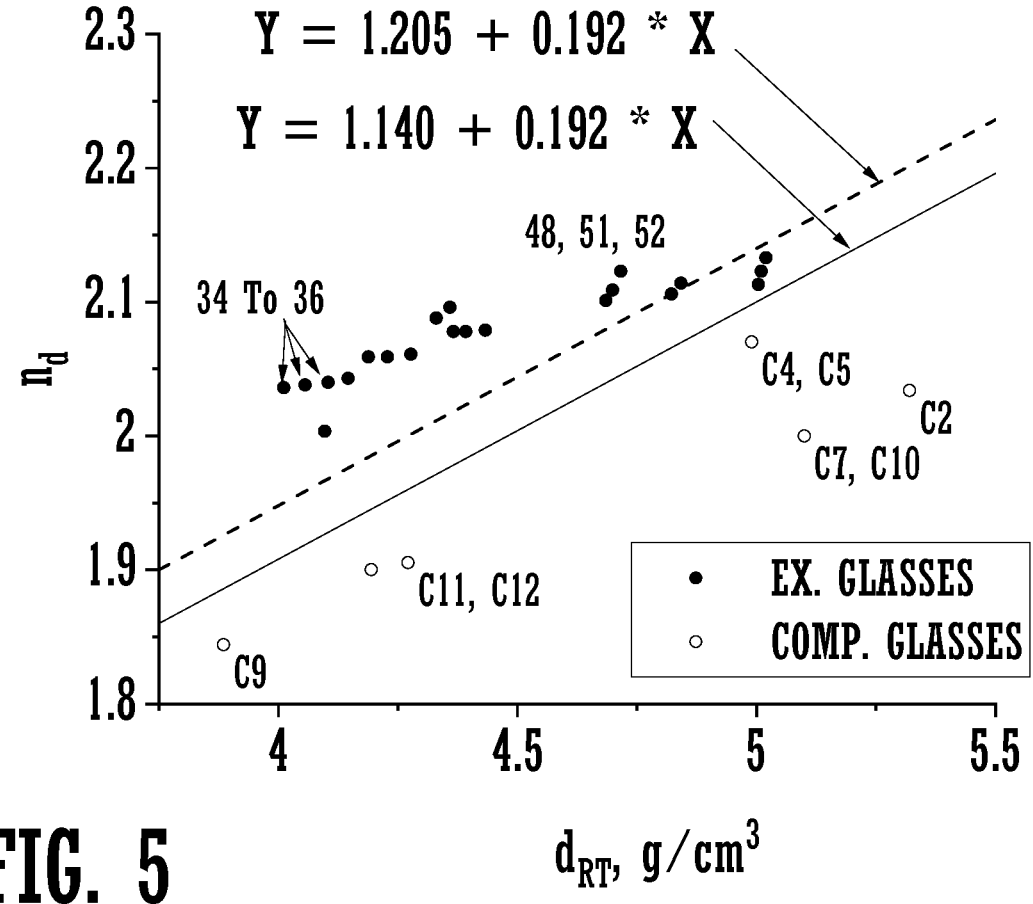
FIG. 5 is a plot illustrating the relationship between the density at room temperature $d_{RT}$ and the refractive index at 587.56 nm $n_d$ for some Comparative Glasses and some Exemplary Glasses according to an embodiment of the present disclosure.

| Limitations for glass compositions shown in FIGS. 4 and 5 | | | |
|---|---|---|---|
| Component | Unit | Min | Max |
| P$_2$O$_5$ | mol. % | 23 | 35 |
| Bi$_2$O$_3$ | mol. % | 4.5 | 35 |
| Nb$_2$O$_5$ | mol. % | 0.5 | 55 |
| TiO$_2$ | mol. % | 0.5 | 55 |
| Li$_2$O | mol. % | 0.3 | 20 |

The Comparative Glasses of FIG. 4 were selected as having the highest value of the parameter P$_n$ over the range of values of the parameter P$_d$ shown in FIG. 4 among the known glasses that have the features specified in Table 7.

The line corresponding to the formula y=1.14+0.192*x shown in FIG. 4 provides a visual representation of the differences between the Comparative Glasses having the features specified in Table 7 and the Exemplary Glasses 13 to 21, 34 to 49, 51 to 57 and 75. As can be seen in FIG. 4, the mentioned Exemplary Glasses (filled circles) and none of the Comparative Glasses (open circles) represented in FIG. 4 fall above the line y=1.14+0.192*x, where y corresponds to the parameter P$_n$ that predicts refractive index at 587.56 nm and x corresponds to the parameter P$_d$ that predicts density at room temperature. In other words, some of the Exemplary Glasses and none of the Comparative Glasses represented in FIG. 4 satisfy the following formula (III)(a):

$$P_n-(1.14+0.192*P_d)>0.00 \qquad \text{(III)(a)}$$

As can also be seen in FIG. 4, some of Exemplary Glasses and none of the Comparative Glasses represented in FIG. 4 fall above the line y=1.18+0.192*x, where y corresponds to the parameter P$_n$ that predicts refractive index at 587.56 nm and x corresponds to the parameter P$_d$ that predicts density at room temperature. In other words, some of the Exemplary Glasses and none of the Comparative Glasses represented in FIG. 4 satisfy the following formula (III)(b):

$$P_n-(1.18+0.192*P_d)>0.00 \qquad \text{(III)(b)}$$

The Exemplary Examples represented in FIG. 4 are, by prediction, superior in terms of the combination of d$_{RT}$ and n$_d$ (i.e. lower d$_{RT}$ for a given n$_d$ or higher n$_d$ for a given d$_{RT}$) to the best known Comparative Glasses that have the features specified in Table 7.

FIG. 5 is a plot showing the relationship between the density at room temperature d$_{RT}$ and the refractive index at 587.56 nm n$_d$ for some of the Exemplary Glasses and some of the Comparative Glasses. The Exemplary Glasses (filled circles) are the Examples 17, 34 to 43, 46 to 48 and 51 to 57 from Table 5. The Comparative Glasses (open circles) are the Examples C2, C4, C5, C7 and C9 to C12 from Table 6. All of the Exemplary Glasses and Comparative Glasses shown in FIG. 5 have the features specified in Table 7.

The Comparative Glasses shown in FIG. 5 were selected as having the highest measured values of the refractive index at 587.56 nm n$_d$ over the range of values of the density at room temperature d$_{RT}$ shown in FIG. 5 among the known glasses that have the mentioned features specified in Table 7.

The line corresponding to the formula y=1.140+0.192*x shown in FIG. 5 provides a visual representation of the differences between the Comparative Glasses having the features specified in Table 7 and the Exemplary Glasses 17, 34 to 43, 46 to 48 and 51 to 57. As can be seen in FIG. 5, the mentioned Exemplary Glasses (filled circles) and none of the Comparative Glasses (open circles) represented in FIG. 5 fall above the line y=1.140+0.192*x, where y corresponds to n$_d$ and x corresponds to d$_{RT}$. In other words, some of the Exemplary Glasses and none of the Comparative Glasses represented in FIG. 5 satisfy the following formula (IV)(a):

$$n_d - (1.140 + 0.192 * d_{RT}) > 0.00 \qquad \text{(IV)(a)}$$

As can also be seen in FIG. 5, some of Exemplary Glasses and none of the Comparative Glasses represented in FIG. 5 fall above the line y=1.18+0.192*x, where y corresponds to $n_d$ and x corresponds to $d_{RT}$. In other words, some of the a given $n_d$ or higher $n_d$ for a given $d_{RT}$) to the best known Comparative Glasses that have the features specified in Table 7.

The values of all attributes specified in Table 7 and Formulas (III)(a), (III)(b), (IV)(a) and (IV)(b) for the Comparative Glasses C1 to C12 plotted in FIGS. 4 and 5 are presented in Table 8 below. Full compositions of the Comparative Glasses are presented in Table 6. Full compositions and attributes of the Exemplary Glasses are presented in Table 5.

TABLE 8

| Attributes of Comparative Example Glasses Having the Features Specified in Table 7 | | | | | | | |
|---|---|---|---|---|---|---|---|
| Ex. # | | C1 | C2 | C3 | C4 | C5 | C6 |
| Composition | | | | | | | |
| $Bi_2O_3$ | mol. % | 5.49 | 24.00 | 19.90 | 17.11 | 17.11 | 23.93 |
| $Nb_2O_5$ | mol. % | 1.75 | 18.00 | 26.87 | 18.72 | 18.72 | 17.93 |
| $TiO_2$ | mol. % | 1.45 | 7.00 | 4.40 | 21.39 | 21.39 | 6.95 |
| $Li_2O$ | mol. % | 15.55 | 2.00 | 3.92 | 2.57 | 2.57 | 2.32 |
| Measured properties | | | | | | | |
| $d_{RT}$ | g/cm$^3$ | | 5.320 | | 4.990 | 4.990 | |
| $n_d$ | | | 2.0339 | | 2.0702 | 2.0702 | |
| $n_d - (1.14 + 0.192 * d_{RT})$ | | | −0.1275 | | −0.0279 | −0.0279 | |
| $n_d - (1.18 + 0.192 * d_{RT})$ | | | −0.1675 | | −0.0679 | −0.0679 | |
| Predicted and calculated properties | | | | | | | |
| $P_d$ | g/cm$^3$ | 3.1667 | 5.2747 | 5.1594 | 4.8343 | 4.8343 | 5.2695 |
| $P_n$ | | 1.6187 | 2.0362 | 2.0765 | 2.0569 | 2.0569 | 2.0351 |
| $P_n - (1.14 + 0.192 * P_d)$ | | −0.1293 | −0.1165 | −0.0541 | −0.0113 | −0.0113 | −0.1166 |
| $P_n - (1.18 + 0.192 * P_d)$ | | −0.1693 | −0.1565 | −0.0941 | −0.0513 | −0.0513 | −0.1566 |
| Ex. # | | C7 | C8 | C9 | C10 | C11 | C12 |
| Composition | | | | | | | |
| $Bi_2O_3$ | mol. % | 21.50 | 20.57 | 5.00 | 20.59 | 4.70 | 8.00 |
| $Nb_2O_5$ | mol. % | 17.30 | 17.91 | 18.00 | 17.92 | 23.27 | 19.00 |
| $TiO_2$ | mol. % | 7.10 | 7.38 | 5.00 | 7.33 | 0.71 | 6.00 |
| $Li_2O$ | mol. % | 8.20 | 7.80 | 20.00 | 7.80 | 16.38 | 18.00 |
| Measured properties | | | | | | | |
| $d_{RT}$ | g/cm$^3$ | 5.100 | | 3.885 | 5.100 | 4.271 | 4.194 |
| $n_d$ | | 2.000 | | 1.8442 | 2.000 | 1.9055 | 1.9002 |
| $n_d - (1.14 + 0.192 * d_{RT})$ | | −0.1192 | | −0.0417 | −0.1192 | −0.0546 | −0.0451 |
| $n_d - (1.18 + 0.192 * d_{RT})$ | | −0.1592 | | −0.0817 | −0.1592 | −0.0946 | −0.0851 |
| Predicted and calculated properties | | | | | | | |
| $P_d$ | g/cm$^3$ | 5.1295 | 4.9964 | 3.7522 | 4.996 | 4.2644 | 4.0447 |
| $P_n$ | | 2.0186 | 2.0052 | 1.8339 | 2.005 | 1.9112 | 1.8845 |
| $P_n - (1.14 + 0.192 * P_d)$ | | −0.1063 | −0.0941 | −0.0266 | −0.0942 | −0.0476 | −0.0321 |
| $P_n - (1.18 + 0.192 * P_d)$ | | −0.1463 | −0.1341 | −0.0666 | −0.1342 | −0.0876 | −0.0721 |

Exemplary Glasses and none of the Comparative Glasses represented in FIG. 5 satisfy the following formula (IV)(b):

$$n_d - (1.18 + 0.192 * d_{RT}) > 0.00 \qquad \text{(IV)(b)}$$

The Exemplary Examples represented in FIG. 5 that satisfy the formula (IV)(b) are characterized by the highest values of $n_d$ at comparable values of $d_{RT}$ among the glasses that have the features specified in Table 7.

This means that, under the conditions specified in Table 7 above, some of the Exemplary Glasses have higher measured values of the refractive index at 587.56 nm $n_d$ at comparable measured values of the density at room temperature $d_{RT}$ than the best of the Comparative Glasses satisfying the same conditions. This can be interpreted as these Exemplary Glasses, according to measurements, have higher values of $n_d$ at comparable values of $d_{RT}$ among the said glasses, i.e. they are, according to measurement, superior in terms of combination of $d_{RT}$ and $n_d$ (i.e. lower $d_{RT}$ for As follows from FIGS. 4 and 5, both predicted and measured property data confirms that some of the Exemplary Glasses have a better combination of refractive index at 587.56 nm $n_d$ and density at room temperature $d_{RT}$ than the best of the Comparative Glasses that have the features specified in Table 7.

The following non-limiting aspects are encompassed by the present disclosure. To the extent not already described, any one of the features of the first through the thirty-fifth aspect may be combined in part or in whole with features of any one or more of the other aspects of the present disclosure to form additional aspects, even if such a combination is not explicitly described.

According to a first aspect, the glass comprises a plurality of components, the glass having a composition of the components comprising greater than or equal to 15.9 mol. % and less than or equal to 50.0 mol. % $P_2O_5$, greater than or equal to 4.5 mol. % and less than or equal to 50.0 mol. %

$Bi_2O_3$, greater than or equal to 0.0 mol. % and less than or equal to 50.0 mol. % $TiO_2$, greater than or equal to 0.0 mol. % and less than or equal to 50.0 mol. % $Nb_2O_5$, greater than or equal to 0.0 mol. % and less than or equal to 25.0 mol. % $Li_2O$, greater than or equal to 0.0 mol. % and less than or equal to 25.0 mol. % $K_2O$, greater than or equal to 0.0 mol. % and less than or equal to 20.0 mol. % $Na_2O$, greater than or equal to 0.0 mol. % and less than or equal to 6.0 mol. % $WO_3$, greater than or equal to 0.0 mol. % and less than or equal to 1.0 mol. % $V_2O_5$, a sum of $TiO_2+Nb_2O_5$ greater than or equal to 25.0 mol. % and less than or equal to 70.0 mol. %, a sum of $Alk_2O$ greater than or equal to 0.5 mol. % and less than or equal to 30.0 mol. %, a sum of RO greater than or equal to 0.5 mol. % and less than or equal to 30.0 mol. %, a sum of $GeO_2+TeO_2$ greater than or equal to 0.0 mol. % and less than or equal to 25.0 mol. % and may optionally contain $Al_2O_3$, wherein the composition of the components satisfies the condition: $Alk_2O+RO+Bi_2O_3+3*Al_2O_3-P_2O_5$ [mol. %]$\geq-8.0$, where $Alk_2O$ is a total sum of alkali metal oxides, and RO is a total sum of divalent metal oxides.

According to a second aspect, the glass of the first aspect, wherein the glass satisfies the conditions: $P_d<4.8$ and $P_n>2.0$, where $P_n$ is a parameter predicting a refractive index at 587.56 nm, $n_d$, calculated from the glass composition in terms of mol. % of the components according to the Formula (I):

$$
\begin{aligned}
P_n = {} & 1.865-0.0052736*P_2O_5+0.0071201*Nb_2O_5+ \\
& 0.0031659*TiO_2-0.0008032*BaO- \\
& 0.0047736*K_2O-0.00076807*CaO- \\
& 0.0027991*Na_2O-0.0016514*Li_2O- \\
& 0.00069646*SrO+0.0032628*WO_3+ \\
& 0.007519*Bi_2O_3-0.0040698*B_2O_3- \\
& 0.0035951*SiO_2-0.00067102*ZnO+ \\
& 0.0022313*ZrO_2-0.0019531*MgO- \\
& 0.003506*Al_2O_3+0.0019216*TeO_2+ \\
& 0.0025766*PbO-0.0018844*GeO_2+ \\
& 0.0065444*Tl_2O+0.0052048*Ag_2O, \quad \text{(I)}
\end{aligned}
$$

and $P_d$ is a parameter predicting a density at room temperature, $d_{RT}$, calculated from the glass composition in terms of mol. % of the components according to the Formula (II):

$$
\begin{aligned}
P_d = {} & 4.45-0.020780*Al_2O_3-0.020918*B_2O_3+ \\
& 0.014152*BaO+0.061008*Bi_2O_3- \\
& 0.0067411*CaO+0.013529*CdO+ \\
& 0.012560*Cs_2O+0.0028892*Ga_2O_3- \\
& 0.0057012*GeO_2-0.017838*K_2O+ \\
& 0.046524*La_2O_3-0.013919*Li_2O- \\
& 0.010279*MgO-0.0064231*MoO_3- \\
& 0.012983*Na_2O+0.0083294*Nb_2O_5- \\
& 0.028926*P_2O_5+0.031742*PbO- \\
& 0.019022*SiO_2+0.0045214*SrO+ \\
& 0.050158*Ta_2O_5+0.0088486*TeO_2- \\
& 0.0063053*TiO_2-0.018941*V_2O_5+ \\
& 0.027483*WO_3-0.0010277*ZnO+ \\
& 0.0100487*ZrO_2, \quad \text{(II).}
\end{aligned}
$$

According to a third aspect, the glass of any one of aspects 1-2, wherein the glass has a density at room temperature, $d_{RT}$, that is less than or equal to 4.8 and a refractive index at 587.56 nm, $n_d$, that is greater than or equal to 2.0.

According to a fourth aspect, the glass of any one of aspects 1-3, wherein the glass has an Abbe number, $v_d$, that is less than or equal to 20.

According to a fifth aspect, the glass of the fourth aspect, wherein the Abbe number, $v_d$, is less than or equal to 18.5.

According to a sixth aspect, the glass of any one of aspects 1-5, wherein the glass has a glass transition temperature, $T_g$, that is greater than or equal to 550° C. and less than or equal to 650° C.

According to a seventh aspect, the glass of any one of aspects 1-6, wherein when cooled in air from 1100° C. to 500° C. in 15 minutes, the glass does not crystallize.

According to an eighth aspect, the glass of any one of aspects 1-7, wherein the composition of the components comprises greater than or equal to 23.5 mol. % and less than or equal to 25.5 mol. % $P_2O_5$, greater than or equal to 10.0 mol. % and less than or equal to 40.0 mol. % $Nb_2O_5$, greater than or equal to 4.5 mol. % and less than or equal to 30.0 mol. % $Bi_2O_3$, greater than or equal to 0.3 mol. % and less than or equal to 40.0 mol. % $TiO_2$, greater than or equal to 0.0 mol. % and less than or equal to 15.0 mol. % $B_2O_3$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $K_2O$, greater than or equal to 0.0 mol. % and less than or equal to 10.0 mol. % $Li_2O$ and greater than or equal to 0.0 mol. % and less than or equal to 10.0 mol. % $Na_2O$.

According to a ninth aspect, the glass of any one of aspects 1-8, wherein the composition of the components comprises one or more of the following components: greater than or equal to 24.05 mol. % and less than or equal to 25.05 mol. % $P_2O_5$, greater than or equal to 14.0 mol. % and less than or equal to 33.0 mol. % $Nb_2O_5$, greater than or equal to 10.0 mol. % and less than or equal to 36.0 mol. % $TiO_2$, greater than or equal to 5.0 mol. % and less than or equal to 25.0 mol. % $Bi_2O_3$, greater than or equal to 0.0 mol. % and less than or equal to 9.0 mol. % BaO, greater than or equal to 0.0 mol. % and less than or equal to 9.0 mol. % CaO, greater than or equal to 0.0 mol. % and less than or equal to 7.5 mol. % $K_2O$, greater than or equal to 0.0 mol. % and less than or equal to 6.5 mol. % $Li_2O$ and greater than or equal to 0.0 mol. % and less than or equal to 6.5 mol. % $Na_2O$.

According to a tenth aspect, the glass of any one of aspects 1-9, wherein the composition of the components comprises greater than or equal to 24.2 mol. % and less than or equal to 25.0 mol. % $P_2O_5$, greater than or equal to 16.5 mol. % and less than or equal to 30.5 mol. % $Nb_2O_5$, greater than or equal to 13.0 mol. % and less than or equal to 33.0 mol. % $TiO_2$, greater than or equal to 5.0 mol. % and less than or equal to 23.0 mol. % $Bi_2O_3$, greater than or equal to 1.75 mol. % and less than or equal to 8.00 mol. % BaO, greater than or equal to 0.0 mol. % and less than or equal to 9.0 mol. % CaO, greater than or equal to 0.0 mol. % and less than or equal to 7.5 mol. % $K_2O$, greater than or equal to 0 mol. % and less than or equal to 5.75 mol. % $Li_2O$ and greater than or equal to 0 mol. % and less than or equal to 5.75 mol. % $Na_2O$.

According to an eleventh aspect, the glass of any one of aspects 1-10, wherein the composition of the components satisfies the condition: $Alk_2O+RO+Bi_2O_3+3*Al_2O_3-P_2O_5$ [mol. %]$\geq0.000$.

According to a twelfth aspect, the glass of any one of aspects 1-7 and 11, wherein the composition of the components comprises greater than or equal to 18.0 mol. % and less than or equal to 28.0 mol. % $P_2O_5$, greater than or equal to 0.0 mol. % and less than or equal to 10.0 mol. % $TeO_2$, greater than or equal to 0.0 mol. % and less than or equal to 5.0 mol. % $GeO_2$, greater than or equal to 0.0 mol. % and less than or equal to 5.0 mol. % $SiO_2$ and a sum of $P_2O_5+B_2O_3$ greater than or equal to 20.0 mol. % and less than or equal to 35.0 mol. %.

According to a thirteenth aspect, the glass of any one of aspects 1-12, wherein the composition of the components comprises greater than or equal to 0.1 mol. % $Li_2O$ and a sum of $Na_2O+K_2O$ greater than or equal to 0.3 mol. %.

According to a fourteenth aspect, the glass of any one of aspects 1-13, wherein the composition of the components comprises greater than or equal to 0.3 mol. % and less than or equal to 20.0 mol. % $R_2O$ and greater than or equal to 0.3 mol. % and less than or equal to 20.0 mol. % RO, where $R_2O$ is a total sum of monovalent metal oxides.

According to a fifteenth aspect, a method for manufacturing an optical element, the method comprising processing a glass, wherein the glass is the glass of any one of aspects 1-14.

According to a sixteenth aspect, an optical element comprising glass, wherein the glass is the glass of any one of aspects 1-15.

According to a seventeenth aspect, the glass comprises a plurality of components, the glass having a composition of the components comprising greater than or equal to 23.0 mol. % and less than or equal to 35.0 mol. % $P_2O_5$, greater than or equal to 4.5 mol. % and less than or equal to 35.0 mol. % $Bi_2O_3$, greater than or equal to 0.5 mol. % and less than or equal to 55.0 mol. % $Nb_2O_5$, greater than or equal to 0.5 mol. % and less than or equal to 55.0 mol. % $TiO_2$, greater than or equal to 0.3 mol. % and less than or equal to 20.0 mol. % $Li_2O$ and may optionally contain one or more components selected from BaO, $K_2O$, CaO, $Na_2O$, SrO, $WO_3$, $B_2O_3$, $SiO_2$, ZnO, $ZrO_2$, MgO, $Al_2O_3$, $TeO_2$, PbO, $GeO_2$, $Tl_2O$, $Ag_2O$, CdO, $Cs_2O$, $Ga_2O_3$, $La_2O_3$, $MoO_3$, $Ta_2O_5$ and $V_2O_5$, the glass satisfies the condition: $P_n-(1.14+0.192*P_d)>0.000$, where $P_n$ is a parameter predicting a refractive index at 587.56 nm, $n_d$, calculated from the glass composition in terms of mol. % of the components according to the Formula (I):

$$P_n=1.865-0.0052736*P_2O_5+0.0071201*Nb_2O_5+$$
$$0.0031659*TiO_2-0.0008032*BaO-$$
$$0.0047736*K_2O-0.00076807*CaO-$$
$$0.0027991*Na_2O-0.0016514*Li_2O-$$
$$0.00069646*SrO+0.0032628*WO_3+$$
$$0.007519*Bi_2O_3-0.0040698*B_2O_3-$$
$$0.0035951*SiO_2-0.00067102*ZnO+$$
$$0.0022313*ZrO_2-0.0019531*MgO-$$
$$0.003506*Al_2O_3+0.0019216*TeO_2+$$
$$0.0025766*PbO-0.0018844*GeO_2+$$
$$0.0065444*Tl_2O+0.0052048*Ag_2O, \quad (I)$$

and $P_d$ is a parameter predicting a density at room temperature, $d_{RT}$, calculated from the glass composition in terms of mol. % of the components according to the Formula (II):

$$P_d=4.45-0.020780*Al_2O_3-0.020918*B_2O_3+$$
$$0.014152*BaO+0.061008*Bi_2O_3-$$
$$0.0067411*CaO+0.013529*CdO+$$
$$0.012560*Cs_2O+0.0028892*Ga_2O_3-$$
$$0.0057012*GeO_2-0.017838*K_2O+$$
$$0.046524*La_2O_3-0.013919*Li_2O-$$
$$0.010279*MgO-0.0064231*MoO_3-$$
$$0.012983*Na_2O+0.0083294*Nb_2O_5-$$
$$0.028926*P_2O_5+0.031742*PbO-$$
$$0.019022*SiO_2+0.0045214*SrO+$$
$$0.050158*Ta_2O_5+0.0088486*TeO_2-$$
$$0.0063053*TiO_2-0.018941*V_2O_5+$$
$$0.027483*WO_3-0.0010277*ZnO+$$
$$0.0100487*ZrO_2, \quad (II).$$

According to an eighteenth aspect, the glass of the seventeenth aspect, wherein the glass satisfies the condition: $n_d-(1.14+0.192*d_{RT})>0.000$, where $n_d$ is a refractive index at 587.56 nm and $d_{RT}$ [g/cm³] is a density at room temperature.

According to a nineteenth aspect, the glass of any one of aspects 17-18, wherein the glass satisfies the condition: $n_d-(1.205+0.192*d_{RT})>0.000$, where $n_d$ is a refractive index at 587.56 nm and $d_{RT}$ [g/cm³] is a density at room temperature.

According to a twentieth aspect, the glass of any one of aspects 17-19, wherein the glass satisfies the condition: $P_n-(1.205+0.192*P_d)>0.000$.

According to a twenty-first aspect, the glass of any one of aspects 17-20, wherein the glass satisfies the conditions: $P_d<4.8$ and $P_n>2.0$.

According to a twenty-second aspect, the glass of any one of aspects 17-21, wherein the glass has a density at room temperature, $d_{RT}$, that is less than or equal to 4.8 g/cm³ and a refractive index at 587.56 nm, $n_d$, that is greater than or equal to 2.0.

According to a twenty-third aspect, the glass of any one of aspects 17-22, wherein the glass has an Abbe number, $v_d$, that is less than or equal to 20.

According to a twenty-fourth aspect, the glass of the twenty-third aspect, wherein the Abbe number, $v_d$, is less than or equal to 18.5.

According to a twenty-fifth aspect, the glass of any one of aspects 17-24, wherein the glass has a glass transition temperature, $T_g$ that is greater than or equal to 550° C. and less than or equal to 650° C.

According to a twenty-sixth aspect, the glass of any one of aspects 17-25, wherein when cooled in air from 1100° C. to 500° C. in 15 minutes, the glass does not crystallize.

According to a twenty-seventh aspect, the glass of any one of aspects 17-26, wherein the composition of the components comprises greater than or equal to 23.5 mol. % and less than or equal to 25.5 mol. % $P_2O_5$, greater than or equal to 10.0 mol. % and less than or equal to 40.0 mol. % $Nb_2O_5$, greater than or equal to 4.5 mol. % and less than or equal to 30.0 mol. % $Bi_2O_3$, greater than or equal to 0.5 mol. % and less than or equal to 40.0 mol. % $TiO_2$, greater than or equal to 0.3 mol. % and less than or equal to 10.0 mol. % $Li_2O$, greater than or equal to 0.0 mol. % and less than or equal to 15.0 mol. % $B_2O_3$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $K_2O$, greater than or equal to 0.0 mol. % and less than or equal to 10.0 mol. % $Na_2O$ and greater than or equal to 0.0 mol. % and less than or equal to 10.0 mol. % $WO_3$.

According to a twenty-eighth aspect, the glass of any one of aspects 17-27, wherein the composition of the components comprises one or more of the following components: greater than or equal to 24.05 mol. % and less than or equal to 25.05 mol. % $P_2O_5$, greater than or equal to 14.0 mol. % and less than or equal to 33.0 mol. % $Nb_2O_5$, greater than or equal to 10.0 mol. % and less than or equal to 36.0 mol. % $TiO_2$, greater than or equal to 5.0 mol. % and less than or equal to 25.0 mol. % $Bi_2O_3$, greater than or equal to 0.3 mol. % and less than or equal to 6.5 mol. % $Li_2O$, greater than or equal to 0.0 mol. % and less than or equal to 9.0 mol. % BaO, greater than or equal to 0.0 mol. % and less than or equal to 9.0 mol. % CaO, greater than or equal to 0.0 mol. % and less than or equal to 7.5 mol. % $K_2O$, greater than or equal to 0.0 mol. % and less than or equal to 6.5 mol. % $Na_2O$ and greater than or equal to 0.0 mol. % and less than or equal to 6.5 mol. % $WO_3$.

According to a twenty-ninth aspect, the glass of any one of aspects 17-28, wherein the composition of the components comprises greater than or equal to 24.2 mol. % and less than or equal to 25.0 mol. % $P_2O_5$, greater than or equal to 16.5 mol. % and less than or equal to 30.5 mol. % $Nb_2O_5$, greater than or equal to 13.0 mol. % and less than or equal to 33.0 mol. % $TiO_2$, greater than or equal to 5.0 mol. % and less than or equal to 23.0 mol. % $Bi_2O_3$, greater than or equal to 1.75 mol. % and less than or equal to 8.00 mol. % BaO, greater than or equal to 0.3 mol. % and less than or equal to 5.8 mol. % $Li_2O$, greater than or equal to 0.0 mol. % and less than or equal to 9.0 mol. % CaO, greater than or equal to 0.0 mol. % and less than or equal to 7.5 mol. % $K_2O$, greater than or equal to 0.0 mol. % and less than or equal to 6.0 mol. % $WO_3$ and greater than or equal to 0 mol. % and less than or equal to 5.75 mol. % $Na_2O$.

According to a thirtieth aspect, the glass of any one of aspects 17-29, wherein the composition of the components satisfies the condition: $Alk_2O+RO+Bi_2O_3+3*Al_2O_3-P_2O_5$ [mol. %]≥0.000, where $Alk_2O$ is a total sum of alkali metal oxides, and RO is a total sum of divalent metal oxides.

According to a thirty-first aspect, the glass of any one of aspects 17-26 and 30, wherein the composition of the components comprises greater than or equal to 23.0 mol. % and less than or equal to 28.0 mol. % $P_2O_5$, greater than or equal to 0.0 mol. % and less than or equal to 10.0 mol. % $TeO_2$, greater than or equal to 0.0 mol. % and less than or equal to 5.0 mol. % $GeO_2$, greater than or equal to 0.0 mol. % and less than or equal to 5.0 mol. % $SiO_2$ and a sum of $P_2O_5+B_2O_3$ greater than or equal to 20.0 mol. % and less than or equal to 35.0 mol. %.

According to a thirty-second aspect, the glass of any one of aspects 17-31, wherein the composition of the components comprises a sum of $Na_2O+K_2O$ greater than or equal to 0.3 mol. %.

According to a thirty-third aspect, the glass of any one of aspects 17-32, wherein the composition of the components comprises greater than or equal to 0.3 mol. % and less than or equal to 20.0 mol. % $R_2O$ and greater than or equal to 0.3 mol. % and less than or equal to 20.0 mol. % RO, where $R_2O$ is a total sum of monovalent metal oxides, and RO is a total sum of divalent metal oxides.

According to a thirty-fourth aspect, a method for manufacturing an optical element, the method comprising processing a glass, wherein the glass is the glass of any one of aspects 17-33.

According to a thirty-fifth aspect, an optical element comprising glass, wherein the glass is the glass of any one of aspects 17-34.

Many variations and modifications may be made to the above-described embodiments of the disclosure without departing substantially from the spirit and various principles of the disclosure. All such modifications and variations are intended to be included herein within the scope of this disclosure and protected by the following claims.

To the extent not already described, the different features of the various aspects of the present disclosure may be used in combination with each other as desired. That a particular feature is not explicitly illustrated or described with respect to each aspect of the present disclosure is not meant to be construed that it cannot be, but it is done for the sake of brevity and conciseness of the description. Thus, the various features of the different aspects may be mixed and matched as desired to form new aspects, whether or not the new aspects are expressly disclosed.

The invention claimed is:

1. A glass comprising a plurality of components, the glass having a composition of the components comprising:

greater than or equal to 15.9 mol. % and less than or equal to 50.0 mol. % $P_2O_5$, greater than or equal to 4.5 mol. % and less than or equal to 50.0 mol. % $Bi_2O_3$, greater than or equal to 0.0 mol. % and less than or equal to 50.0 mol. % $TiO_2$, greater than or equal to 0.0 mol. % and less than or equal to 50.0 mol. % $Nb_2O_5$, greater than or equal to 0.0 mol. % and less than or equal to 25.0 mol. % $Li_2O$, greater than or equal to 0.0 mol. % and less than or equal to 25.0 mol. % $K_2O$, greater than or equal to 0.0 mol. % and less than or equal to 20.0 mol. % $Na_2O$, greater than or equal to 0.0 mol. % and less than or equal to 6.0 mol. % $WO_3$, greater than or equal to 0.0 mol. % and less than or equal to 1.0 mol. % $V_2O_5$, a sum of $TiO_2+Nb_2O_5$ greater than or equal to 25.0 mol. % and less than or equal to 70.0 mol. %, a sum of $Alk_2O$ greater than or equal to 0.5 mol. % and less than or equal to 30.0 mol. %, a sum of RO greater than or equal to 0.5 mol. % and less than or equal to 30.0 mol. %, a sum of $GeO_2+TeO_2$ greater than or equal to 0.0 mol. % and less than or equal to 25.0 mol. % and optionally comprising $Al_2O_3$, wherein the composition of the components satisfies the condition:

$$Alk_2O+RO+Bi_2O_3+3*Al_2O_3—P_2O_5[mol. \%]≥-8.0$$

where $Alk_2O$ is a total sum of alkali metal oxides and RO is a total sum of divalent metal oxides, an asterisk (*) means multiplication, and wherein none of the ranges of the components is modified by the term "about".

2. The glass of claim 1, wherein the glass satisfies the conditions:

$P_d$<4.8 and $P_n$>2.0, where $P_n$ is a parameter predicting a refractive index at 587.56 nm, $n_d$, calculated from the glass composition in terms of mol. % of the components according to the Formula (I):

$$\begin{aligned}P_n=&1.865-0.0052736*P_2O_5+0.0071201*Nb_2O_5+\\&0.0031659*TiO_2-0.0008032*BaO-\\&0.0047736*K_2O-0.00076807*CaO-\\&0.0027991*Na_2O-0.0016514*Li_2O-\\&0.00069646*SrO+0.0032628*WO_3+\\&0.007519*Bi_2O_3-0.0040698*B_2O_3-\\&0.0035951*SiO_2-0.00067102*ZnO+\\&0.0022313*ZrO_2-0.0019531*MgO-\\&0.003506*Al_2O_3+0.0019216*TeO_2+\\&0.0025766*PbO-0.0018844*GeO_2+\\&0.0065444*Tl_2O+0.0052048*Ag_2O,\end{aligned} \quad (I)$$

and $P_d$ is a parameter predicting a density at room temperature, $d_{RT}$, calculated from the glass composition in terms of mol. % of the components according to the Formula (II):

$$\begin{aligned}P_d=&4.45-0.020780*Al_2O_3-0.020918*B_2O_3+\\&0.014152*BaO+0.061008*Bi_2O_3-\\&0.0067411*CaO+0.013529*CdO+\\&0.012560*Cs_2O+0.0028892*Ga_2O_3-\\&0.0057012*GeO_2-0.017838*K_2O+\\&0.046524*La_2O_3-0.013919*Li_2O-\\&0.010279*MgO-0.0064231*MoO_3-\\&0.012983*Na_2O+0.0083294*Nb_2O_5-\\&0.028926*P_2O_5+0.031742*PbO-\\&0.019022*SiO_2+0.0045214*SrO+\\&0.050158*Ta_2O_5+0.0088486*TeO_2-\\&0.0063053*TiO_2-0.018941*V_2O_5+\\&0.027483*WO_3-0.0010277*ZnO+\\&0.0100487*ZrO_2,\end{aligned} \quad (II)$$

wherein neither of the parameters $P_n$ and Pa is modified by the term "about".

3. The glass of claim 1, wherein the glass has an Abbe number, $v_d$, that is less than or equal to 20.

4. The glass of claim 1, wherein when cooled in air from 1100° C. to 500° C. in 15 minutes, the glass does not crystallize.

5. The glass of claim 1, wherein the composition of the components comprises:

greater than or equal to 23.5 mol. % and less than or equal to 25.5 mol. % $P_2O_5$, greater than or equal to 10.0 mol. % and less than or equal to 40.0 mol. % $Nb_2O_5$, greater than or equal to 4.5 mol. % and less than or equal to 30.0 mol. % $Bi_2O_3$, greater than or equal to 0.3 mol. % and less than or equal to 40.0 mol. % $TiO_2$, greater than or equal to 0.0 mol. % and less than or equal to 15.0 mol. % $B_2O_3$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $K_2O$, greater than or equal to 0.0 mol. % and less than or equal to 10.0 mol. % $Li_2O$ and greater than or equal to 0.0 mol. % and less than or equal to 10.0 mol. % $Na_2O$.

6. The glass of claim 1, wherein the composition of the components comprises:

greater than or equal to 24.2 mol. % and less than or equal to 25.0 mol. % $P_2O_5$, greater than or equal to 16.5 mol. % and less than or equal to 30.5 mol. % $Nb_2O_5$, greater than or equal to 13.0 mol. % and less than or equal to 33.0 mol. % $TiO_2$, greater than or equal to 5.0 mol. % and less than or equal to 23.0 mol. % $Bi_2O_3$, greater than or equal to 1.75 mol. % and less than or equal to 8.00 mol. % BaO, greater than or equal to 0.0 mol. % and less than or equal to 9.0 mol. % CaO, greater than or equal to 0.0 mol. % and less than or equal to 7.5 mol. % $K_2O$, greater than or equal to 0 mol. % and less than or equal to 5.75 mol. % $Li_2O$ and greater than or equal to 0 mol. % and less than or equal to 5.75 mol. % $Na_2O$.

7. The glass of claim 1, wherein the composition of the components satisfies the condition:

$$Alk_2O + RO + Bi_2O_3 + 3*Al_2O_3 - P_2O_5[\text{mol. }\%] \geq 0.000.$$

8. The glass of claim 1, wherein the composition of the components comprises:

greater than or equal to 0.1 mol. % $Li_2O$ and a sum of $Na_2O + K_2O$ is greater than or equal to 0.3 mol. %.

9. A method for manufacturing an optical element, the method comprising processing a glass, wherein the glass is the glass of claim 1.

10. An optical element comprising glass, wherein the glass is the glass of claim 1.

11. A glass comprising a plurality of components, the glass having a composition of the components comprising:

greater than or equal to 23.0 mol. % and less than or equal to 35.0 mol. % $P_2O_5$, greater than or equal to 4.5 mol. % and less than or equal to 35.0 mol. % $Bi_2O_3$, greater than or equal to 0.5 mol. % and less than or equal to 55.0 mol. % $Nb_2O_5$, greater than or equal to 0.5 mol. % and less than or equal to 55.0 mol. % $TiO_2$, greater than or equal to 0.3 mol. % and less than or equal to 20.0 mol. % $Li_2O$ and optionally comprising one or more components selected from BaO, $K_2O$, CaO, $Na_2O$, SrO, $WO_3$, $B_2O_3$, $SiO_2$, ZnO, $ZrO_2$, MgO, $Al_2O_3$, $TeO_2$, PbO, $GeO_2$, $Tl_2O$, $Ag_2O$, CdO, $Cs_2O$, $Ga_2O_3$, $La_2O_3$, $MoO_3$, $Ta_2O_5$ and $V_2O_5$, wherein none of the ranges of the components is modified by the term "about", wherein the glass satisfies the condition:

$$P_n - (1.14 + 0.192*Pa) > 0.000,$$

where $P_n$ is a refractive index at 587.56 nm, $n_d$, calculated from the glass composition in terms of mol. % of the components according to the Formula (I):

$$\begin{aligned}P_n = {} & 1.865 - 0.0052736*P_2O_5 + 0.0071201*Nb_2O_5 + \\ & 0.0031659*TiO_2 - 0.0008032*BaO - \\ & 0.0047736*K_2O - 0.00076807*CaO - \\ & 0.0027991*Na_2O - 0.0016514*Li_2O - \\ & 0.00069646*SrO + 0.0032628*WO_3 + \\ & 0.007519*Bi_2O_3 - 0.0040698*B_2O_3 - \\ & 0.0035951*SiO_2 - 0.00067102*ZnO + \\ & 0.0022313*ZrO_2 - 0.0019531*MgO - \\ & 0.003506*Al_2O_3 + 0.0019216*TeO_2 + \\ & 0.0025766*PbO - 0.0018844*GeO_2 + \\ & 0.0065444*Tl_2O + 0.0052048*Ag_2O, \quad \text{(I)}\end{aligned}$$

and $P_d$ is a parameter predicting a density at room temperature, $d_{RT}$, calculated from the glass composition in terms of mol. % of the components according to the Formula (II):

$$\begin{aligned}P_d = {} & 4.45 - 0.020780*Al_2O_3 - 0.020918*B_2O_3 + \\ & 0.014152*BaO + 0.061008*Bi_2O_3 - \\ & 0.0067411*CaO + 0.013529*CdO + \\ & 0.012560*Cs_2O + 0.0028892*Ga_2O_3 - \\ & 0.0057012*GeO_2 - 0.017838*K_2O + \\ & 0.046524*La_2O_3 - 0.013919*Li_2O - \\ & 0.010279*MgO - 0.0064231*MoO_3 - \\ & 0.012983*Na_2O + 0.0083294*Nb_2O_5 - \\ & 0.028926*P_2O_5 + 0.031742*PbO - \\ & 0.019022*SiO_2 + 0.0045214*SrO + \\ & 0.050158*Ta_2O_5 + 0.0088486*TeO_2 - \\ & 0.0063053*TiO_2 - 0.018941*V_2O_5 + \\ & 0.027483*WO_3 - 0.0010277*ZnO + \\ & 0.0100487*ZrO_2, \quad \text{(II)}\end{aligned}$$

where an asterisk (*) means multiplication and neither of the parameters $P_n$ and Pa is modified by the term "about".

12. The glass of claim 11, wherein the glass satisfies the condition:

$$n_d - (1.14 + 0.192*d_{RT}) > 0.000,$$

where $n_d$ is a refractive index at 587.56 nm, $d_{RT}$ [g/cm³] is a density at room temperature.

13. The glass of claim 11, wherein the glass has an Abbe number, $v_d$, that is less than or equal to 20.

14. The glass of claim 11, wherein when cooled in air from 1100° C. to 500° C. in 15 minutes, the glass does not crystallize.

15. The glass of claim 11, wherein the composition of the components comprises:

greater than or equal to 23.5 mol. % and less than or equal to 25.5 mol. % $P_2O_5$, greater than or equal to 10.0 mol. % and less than or equal to 40.0 mol. % $Nb_2O_5$, greater than or equal to 4.5 mol. % and less than or equal to 30.0 mol. % $Bi_2O_3$, greater than or equal to 0.5 mol. % and less than or equal to 40.0 mol. % $TiO_2$, greater than or equal to 0.3 mol. % and less than or equal to 10.0 mol. % $Li_2O$, greater than or equal to 0.0 mol. % and less than or equal to 15.0 mol. % $B_2O_3$, greater than or equal to 0.0 mol. % and less than or equal to 10.0 mol. % BaO, greater than or equal to 0.0 mol. % and less than or equal to 10.0 mol. % CaO, greater than or equal to 0.0 mol. % and less than or equal to 10.0 mol. % $K_2O$, greater than or equal to 0.0 mol. % and less than or equal to 10.0 mol. % $Na_2O$ and greater than or equal to 0.0 mol. % and less than or equal to 10.0 mol. % $WO_3$.

16. The glass of claim 11, wherein the composition of the components comprises:

greater than or equal to 24.2 mol. % and less than or equal to 25.0 mol. % $P_2O_5$, greater than or equal to 16.5 mol. % and less than or equal to 30.5 mol. % $Nb_2O_5$, greater than or equal to 13.0 mol. % and less than or equal to 33.0 mol. % $TiO_2$, greater than or equal to 5.0 mol. % and less than or equal to 23.0 mol. % $Bi_2O_3$, greater than or equal to 1.75 mol. % and less than or equal to 8.00 mol. % BaO, greater than or equal to 0.3 mol. % and less than or equal to 5.8 mol. % $Li_2O$, greater than or equal to 0.0 mol. % and less than or equal to 9.0 mol. % CaO, greater than or equal to 0.0 mol. % and less than or equal to 7.5 mol. % $K_2O$, greater than or equal to 0.0 mol. % and less than or equal to 6.0 mol. % $WO_3$ and greater than or equal to 0 mol. % and less than or equal to 5.75 mol. % $Na_2O$.

17. The glass of claim 11, wherein the composition of the components satisfies the condition:

$$Alk_2O+RO+Bi_2O_3+3*Al_2O_3-P_2O_5[mol.\ \%]\geq 0.000,$$

where chemical formulas mean the content of corresponding components in the glass, $Alk_2O$ is a total sum of alkali metal oxides and RO is a total sum of divalent metal oxides.

18. The glass of claim 11, wherein the composition comprises:

a sum of $Na_2O+K_2O$ is greater than or equal to 0.3 mol. %.

19. The glass of claim 11, wherein the composition of the components comprises:

greater than or equal to 0.3 mol. % and less than or equal to 20.0 mol. % $R_2O$ and greater than or equal to 0.3 mol. % and less than or equal to 20.0 mol. % RO, where $R_2O$ is a total sum of monovalent metal oxides and RO is a total sum of divalent metal oxides.

20. An optical element comprising glass, wherein the glass is the glass of claim 11.

* * * * *